(12) United States Patent
Castellanos Mantilla et al.

(10) Patent No.: US 12,533,318 B2
(45) Date of Patent: Jan. 27, 2026

(54) JET MIXING LIPID NANOPARTICLE MANUFACTURING PROCESS

(71) Applicant: GLAXOSMITHKLINE BIOLOGICALS SA, Rixensart (BE)

(72) Inventors: Maria Monica Castellanos Mantilla, Rockville, MD (US); Andrzej Stanislaw Pitek, Rockville, MD (US)

(73) Assignee: GlaxoSmithKline Biologicals SA, Rixensart (BE)

( * ) Notice: Subject to any disclaimer, the term of this patent is extended or adjusted under 35 U.S.C. 154(b) by 939 days.

(21) Appl. No.: 17/638,916

(22) PCT Filed: Aug. 28, 2020

(86) PCT No.: PCT/IB2020/058044
§ 371 (c)(1),
(2) Date: Feb. 28, 2022

(87) PCT Pub. No.: WO2021/038508
PCT Pub. Date: Mar. 4, 2021

(65) Prior Publication Data
US 2023/0172858 A1 Jun. 8, 2023

Related U.S. Application Data

(60) Provisional application No. 62/894,046, filed on Aug. 30, 2019.

(51) Int. Cl.
*A61K 9/1277* (2025.01)
*A61K 47/69* (2017.01)
*B01L 3/00* (2006.01)

(52) U.S. Cl.
CPC ........ *A61K 9/1277* (2013.01); *A61K 47/6911* (2017.08); *B01L 3/502715* (2013.01);
(Continued)

(58) Field of Classification Search
CPC .. A61K 47/69; A61K 47/6911; A61K 9/0019; A61K 9/127; A61K 9/1271;
(Continued)

(56) References Cited

U.S. PATENT DOCUMENTS 6,113,918 A  9/2000 Johnson et al.
6,846,489 B1 1/2005 Garcon et al.
(Continued)

FOREIGN PATENT DOCUMENTS

CN 1480136 A 3/2004
CN 102133186 A 7/2011
(Continued)

OTHER PUBLICATIONS

"Lab-on-a-Chip Catalogue," Microfluidic ChipShop GmbH, Jan. 2018, 294 pages total.
(Continued)

*Primary Examiner* — Yunju Kim
(74) *Attorney, Agent, or Firm* — Christopher Lee Wright

(57) ABSTRACT

Improved methods for manufacturing a non-viral delivery system comprising a liposome encapsulating an RNA using a microfluidic device and compositions for use therein are provided.

17 Claims, 5 Drawing Sheets

Figure 1:
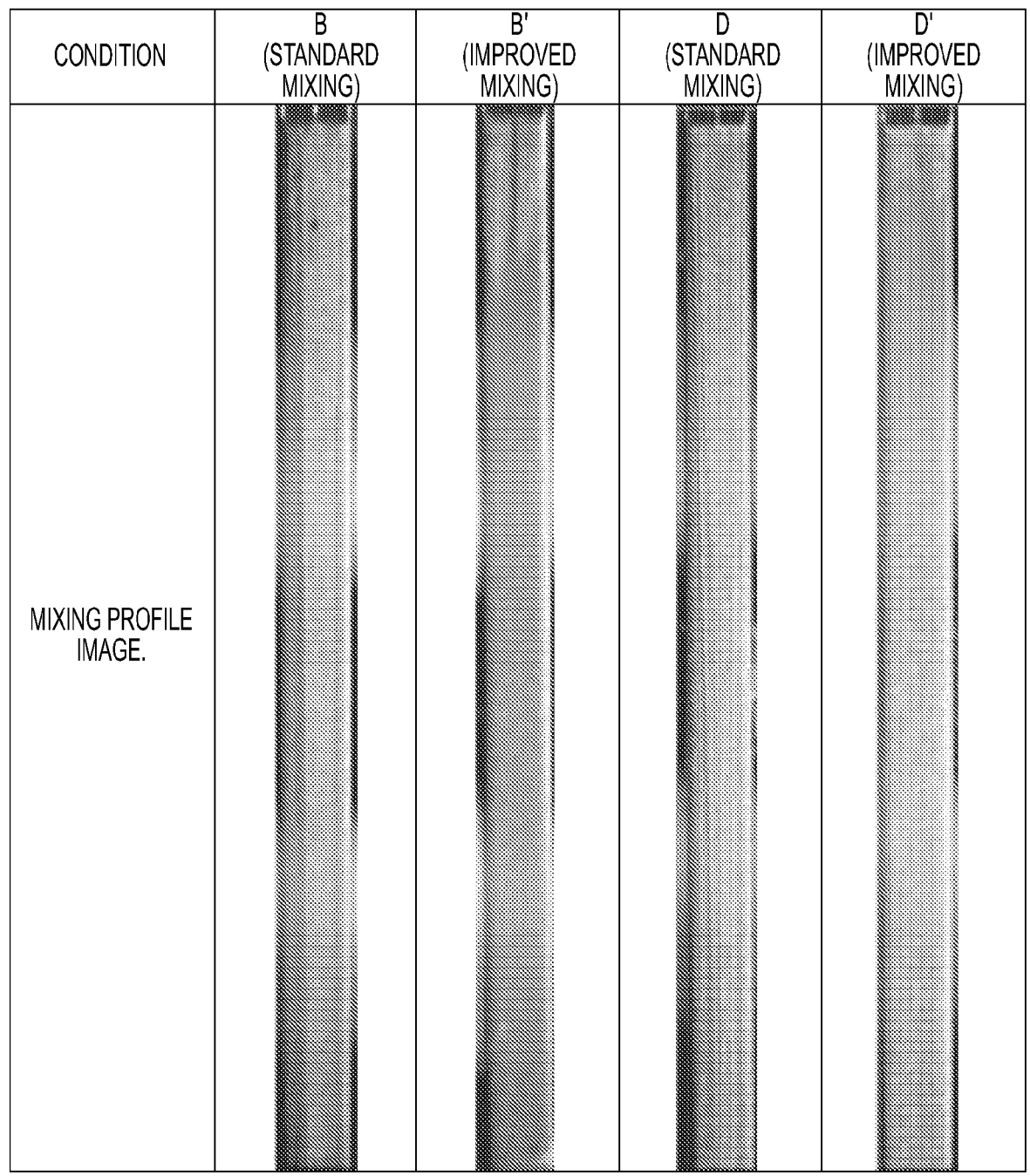

(52) U.S. Cl.
CPC ... *B01L 3/50273* (2013.01); *B01L 2300/0681* (2013.01); *B01L 2300/0861* (2013.01); *B01L 2400/0487* (2013.01)

(58) Field of Classification Search
CPC ....... A61K 9/1272; A61K 9/1277; B01L 3/00; B01L 3/502715; B01L 3/50273; B01L 2300/0681; B01L 2300/0861; B01L 2400/0487
See application file for complete search history.

(56) References Cited

U.S. PATENT DOCUMENTS

| | | | |
|---|---|---|---|
| 7,998,913 | B2 | 8/2011 | Numajiri |
| 8,563,325 | B1 | 10/2013 | Bartsch et al. |
| 8,608,114 | B2 | 12/2013 | Smith et al. |
| 8,722,064 | B2 | 5/2014 | Reed et al. |
| 9,168,645 | B2 | 10/2015 | Wassenhoven et al. |
| 9,198,645 | B2 | 12/2015 | Jahn et al. |
| 9,750,812 | B2 | 9/2017 | Ali et al. |
| 11,243,494 | B2 | 2/2022 | Mueth et al. |
| 11,844,828 | B2 | 12/2023 | Bertaud et al. |
| 2001/0053365 | A1 | 12/2001 | Friede et al. |
| 2002/0097633 | A1 | 7/2002 | O'Connor et al. |
| 2005/0112184 | A1 | 5/2005 | Jahn et al. |
| 2007/0242560 | A1 | 10/2007 | Norikane et al. |
| 2010/0022007 | A1 | 1/2010 | Kenis et al. |
| 2010/0182868 | A1 | 7/2010 | Woehl |
| 2010/0202928 | A1 | 8/2010 | Gaitan et al. |
| 2011/0212167 | A1 | 9/2011 | Ali et al. |
| 2012/0276209 | A1* | 11/2012 | Cullis ............... A61K 9/146 424/490 |
| 2012/0321694 | A1 | 12/2012 | Larocque et al. |
| 2013/0119570 | A1 | 5/2013 | Sugiura et al. |
| 2013/0168885 | A1 | 7/2013 | Omiatek et al. |
| 2013/0195969 | A1 | 8/2013 | Geall et al. |
| 2013/0202684 | A1 | 8/2013 | Geall et al. |
| 2015/0017191 | A1 | 1/2015 | Fox et al. |
| 2015/0110854 | A1 | 4/2015 | Shaw et al. |
| 2015/0115488 | A1 | 4/2015 | Hood et al. |
| 2016/0051954 | A1 | 2/2016 | Brujic et al. |
| 2016/0214103 | A1 | 7/2016 | Cullis et al. |
| 2016/0276209 | A1 | 9/2016 | Usenko |
| 2016/0324783 | A1 | 11/2016 | Fox et al. |
| 2016/0361411 | A1 | 12/2016 | Gindy et al. |
| 2017/0071967 | A1 | 3/2017 | Dutta et al. |
| 2017/0144123 | A1 | 5/2017 | Tabeling et al. |
| 2017/0333348 | A1 | 11/2017 | Kim et al. |
| 2021/0069321 | A1 | 3/2021 | Schneider-Ohrum et al. |
| 2021/0128474 | A1 | 5/2021 | Strodiot et al. |
| 2021/0162042 | A1 | 6/2021 | Harvengt et al. |
| 2022/0032247 | A1 | 2/2022 | Buesink et al. |
| 2022/0339282 | A1 | 10/2022 | Harvengt et al. |
| 2023/0277657 | A1 | 9/2023 | Jehoulet et al. |

FOREIGN PATENT DOCUMENTS

| | | |
|---|---|---|
| CN | 102302453 A | 1/2012 |
| CN | 102327224 A | 1/2012 |
| CN | 103796642 A | 5/2014 |
| CN | 106902081 A | 6/2017 |
| EP | 1 473 084 A2 | 11/2004 |
| EP | 1 810 746 A1 | 7/2007 |
| EP | 2 596 858 A1 | 5/2013 |
| EP | 2 364 720 B1 | 5/2014 |
| EP | 2 759 344 A2 | 7/2014 |
| FR | 3 043 919 A1 | 5/2017 |
| JP | 2008-163010 A | 7/2008 |
| WO | WO 96/33739 A1 | 10/1996 |
| WO | WO 98/15287 A1 | 4/1998 |
| WO | WO 00/07621 A2 | 2/2000 |
| WO | WO 2005/103106 A1 | 11/2005 |
| WO | WO 2005/112991 A2 | 12/2005 |
| WO | WO 2007/062831 A1 | 6/2007 |
| WO | WO 2009/136300 A2 | 11/2009 |
| WO | WO 2010/142685 A1 | 12/2010 |
| WO | WO 2010/142686 A1 | 12/2010 |
| WO | WO 2011/140627 A1 | 11/2011 |
| WO | WO 2012/030901 A1 | 3/2012 |
| WO | WO 2013/041572 A1 | 3/2013 |
| WO | WO 2015/063710 A1 | 5/2015 |
| WO | WO 2015/095340 A1 | 6/2015 |
| WO | WO 2015/095346 A1 | 6/2015 |
| WO | WO 2015/148764 A1 | 10/2015 |
| WO | WO 2016/037053 A1 | 3/2016 |
| WO | WO 2016/138175 A1 | 9/2016 |
| WO | WO 2017/097783 A1 | 6/2017 |
| WO | WO 2017/20057 A1 | 11/2017 |
| WO | 2018220553 A1 | 12/2018 |
| WO | WO 2018/219521 A1 | 12/2018 |

OTHER PUBLICATIONS

"Lab-on-a-Chip Catalogue," Microfluidic ChipShop GmbH, Oct. 2016, 246 pages total.

Arias et al., "Glucopyranosyl lipid adjuvant (GLA), a synthetic TLR4 agonist, promotes potent systemic and mucosal responses to intranasal immunization with HIVgp140," PLoS One, vol. 7, Issue 7, e41144, Jul. 2012, pp. 1-8.

Black et al., "Developing vaccines for an aging population," Science Translational Medicine, vol. 7, Issue 281, 281ps8, Apr. 1, 2015, pp. 1-7.

Coler et al., "Development and characterization of synthetic glucopyranosyl lipid adjuvant system as a vaccine adjuvant," PLoS One, vol. 6, Issue 1, e16333, Jan. 2011, pp. 1-12.

Dalsgaard, "Saponin adjuvants: III. Isolation of a substance from quillaja saponaria molina with adjuvant activity in foot-and-mouth disease vaccines," Archiv für die gesamte Virusforschung, vol. 44, 1974, pp. 243-254.

Damiati et al., "Microfluidic devices for drug delivery systems and drug screening," Genes, vol. 9, No. 103, 2018, pp. 1-24.

De Becker et al., "The adjuvant monophosphoryl lipid A increases the function of antigen-presenting cells," International Immunology, vol. 12, No. 6, 2000, pp. 807-815.

Dendouga et al, "Cell-mediated immune responses to a varicella-zoster virus glycoprotein E vaccine using both a TLR agonist and QS21 in mice," Vaccine, vol. 30, 2012, pp. 3126-3135.

Didierlaurent et al., "Adjuvant system AS01: helping to overcome the challenges of modern vaccines," Expert Review of Vaccines, vol. 16, No. 1, 2017, pp. 55-63.

Didierlaurent et al., "Enhancement of adaptive immunity by the human vaccine adjuvant AS01 depends on activated dendritic cells," The Journal of Immunology, vol. 193, No. 4, 2014, pp. 1920-1930.

Dillon et al., "Molecular characterization and human T-cell responses to a member of a novel *Mycobacterium tuberculosis* mtb39 gene family," Infection and Immunity, vol. 67, No. 6, Jun. 1999, pp. 2941-2950.

Fochesato et al., "Comparative preclinical evaluation of AS01 versus other adjuvant systems in a candidate herpes zoster glycoprotein E subunit vaccine," Human Vaccines & Immunotherapeutics, vol. 12, No. 8, 2016, pp. 2092-2095.

Fung et al., "Optimizing manufacturing and composition of a TLR4 nanosuspension: physicochemical stability and vaccine adjuvant activity," Journal of Nanobiotechnology, vol. 11, No. 43, 2013, pp. 1-12.

Garcon et al., "Recent clinical experience with vaccines using MPL-and OS-21-containing adjuvant systems;" Expert Review of Vaccines, vol. 10, No. 4, 2011, pp. 471-486.

Geall et al., "Nonviral delivery of self-amplifying RNA vaccines," Proceedings of the National Academy of Sciences, vol. 109, No. 36, Sep. 4, 2012, pp. 14604-14609.

Haumont et al., "Purification, characterization and immunogenicity of recombinant varicella-zoster virus glycoprotein gE secreted by Chinese hamster ovary cells," Virus Research, vol. 40, 1996, pp. 199-204.

(56) References Cited

OTHER PUBLICATIONS

Helminen et al., "A major outer membrane protein of Moraxella catarrhalis is a target for antibodies that enhance pulmonary clearance of the pathogen in an animal model," Infection and Immunity, vol. 61, No. 5, May 1993, pp. 2003-2010.
Hood et al., "High-throughput continuous flow production of nanoscale liposomes by microfluidic. vertical flow focusing," Small, vol. 11, No. 43, 2015, pp. 5790-5799.
Ismaili et al. "Monophosphoryl lipid A activates both human dendritic cells and T cells," The Journal of Immunology, vol. 168, No. 2, 2002, pp. 926-932.
Jahn et al., "Microfluidic directed formation of liposomes of controlled size," Langmuir, vol. 23, No. 11, 2007, pp. 6289-6293.
Javaid et al., "Analysis of passive mixing in a serpentine microchannel with sinusoidal side walls," Micromachines, vol. 9, No. 8, 2017, pp. 1-15.
Jeffs et al., "A scalable, extrusion-free method for efficient liposomal encapsulation of plasmid DNA," Pharmaceutical Research, vol. 22, No. 3, Mar. 2005, pp. 362-372.
Joshi et al., "Microfluidics based manufacture of liposomes simultaneously entrapping hydrophilic and lipophilic drugs," International Journal of Pharmaceutics, vol. 514, 2016, pp. 160-168.
Karthikeyan et al., "Numerical modeling and parametric optimization of micromixer for low diffusivity fluids," International Journal of Chemical Reactor Engineering, 20160231, 2018, pp. 1-11.
Kastner et al., "High-throughput manufacturing of size-tuned liposomes by a new microfluidics method using enhanced statistical tools for characterization," International Journal of Pharmaceutics, vol. 477, 2014, pp. 361-368.
Kensil et al., "QS-21: a water-soluble triterpene glycoside adjuvant," Expert Opinion on Investigational Drugs, vol. 7, No. 9, 1998, pp. 1475-1482.
Kensil et al., "Separation and characterization of saponins with adjuvant activity from quillaja saponaria molina cortex," The Journal of Immunology, vol. 146, No. 2, Jan. 15, 1991, pp. 431-437.
Kim et al., "Mass production and size control of lipid-polymer hybrid nanoparticles through controlled microvortices," Nano Letters, vol. 12, published Jun. 20, 2012, Correction published Sep. 17, 2013, pp. 3587-3591.
Lambrecht et al., "Mechanism of action of clinically approved adjuvants, " Current Opinion in Immunology, vol. 21, 2009, pp. 23-29.
Leroux-Roels et al., "A phase 1/2 clinical trial evaluating safety and immunogenicity of a varicella zoster glycoprotein E subunit vaccine candidate in young and older adults," The Journal of Infectious Diseases, vol. 206, Oct. 15, 2012, pp. 1280-1290.
Li et al., "Cutting edge: inflammasome activation by alum and alum's adjuvant effect are mediated by NLRP3;" The Journal of Immunology, vol. 181, No. 1, 2008, pp. 17-21.
Liang et al., "Simulation and experiment of capillary driven passive planar baffle micro-mixer," Proceedings of the 10th IEEE International Conference on Nano/Micro Engineered and Molecular Systems, Apr. 7-11, 2015, pp. 120-123.
Livingston et al., "Phase 1 trial of immunological adjuvant QS-21 with a GM2 ganglioside-keyhole limpet haemocyanin conjugate vaccine in patients with malignant melanoma," Vaccine, vol. 12, No. 14, 1994, pp. 1275-1280.
Martin et al., "Role of innate immune factors in the adjuvant activity of monophosphoryl lipid A;" Infection and Immunity, vol. 71, No. 5, May 2003, pp. 2498-2507.
Marty-Roix et al., "Identification of QS-21 as an inflammasome-activating molecular component of saponin adjuvants," Journal of Biological Chemistry, vol. 291, No. 3, Jan. 15, 2016, pp. 1123-1136.
Mata-Haro et al., "The vaccine adjuvant monophosphoryl lipid A as a TRIF-biased agonist of TLR4," Science, vol. 316, Jun. 15, 2007, pp. 1628-1632.
McLellan et al. "Structure of RSV fusion glycoprotein trimer bound to a prefusion-specific neutralizing antibody," Science, vol. 340, No. 6136, May 31, 2013, pp. 1113-1117.
McLellan et al., "Structure-based design of a fusion glycoprotein vaccine for respiratory syncytial virus," Science, vol. 342, No. 6158, Nov. 1, 2013, pp. 592-598.
Meijer et al., "Passive and active mixing in microfluidic devices," Macromolecular Symposia, vol. 279, 2009, pp. 201-209.
Newman et al., "Saponin adjuvant induction of ovalbumin-specific CD8+ cytotoxic T lymphocyte responses," Journal of Immunology, vol. 148, No. 8, Apr. 15, 1992, pp. 2357-2362.
Perrie et al., "Designing liposomal adjuvants for the next generation of vaccines," Advanced Drug Delivery Reviews, vol. 99, 2016, pp. 85-96.
Perrie et al., "Microfluidics production of liposomes—from low solubility drugs to vaccines," Nanomedicines: Materials, Manufacturing and Therapeutic Applications, Jul. 16, 2016, 42 pages total.
Ragupathi et al., "Natural and synthetic saponin adjuvant QS-21 for vaccines against cancer," Expert Review of Vaccines, vol. 10, No. 4, Apr. 2011, pp. 463-470 (14 pages total).
Rasouli et al., "Numerical study on low Reynolds mixing of T-shaped micro-mixers with obstacles," Trans. Phenom. Nano Micro Sales, vol. 3, No. 2, 2015, pp. 68-76.
Rigter et al., "A protective and safe intranasal RSV vaccine based on a recombinant prefusion-like form of the F protein bound to bacterium-like particles," PLoS One, vol. 8, Issue 8, e71072, Aug. 2013, pp. 1-14.
Skeiky et al., "Cloning, expression, and immunological evaluation of two putative secreted serine protease antigens of *Mycobacterium tuberculosis*," Infection and Immunity, vol. 67, No. 8, Aug. 1999, pp. 3998-4007.
Skeiky et al., "Differential immune responses and protective efficacy induced by components of a tuberculosis polyprotein vaccine, Mtb72F, delivered as naked DNA or recombinant protein," The Journal of Immunology, vol. 172, No. 12, 2004, pp. 7618-7628.
Soltysik et al., "Structure/function studies of QS-21 adjuvant: assessment of triterpene aldehyde and glucuronic acid roles in adjuvant function," Vaccine, vol. 13, No. 15, 1995, pp. 1403-1410.
Vafai, "Antibody-binding sites on truncated forms of varicella-zoster virus gpl(gE) glycoprotein," Vaccine, vol. 12, No. 14, 1994, pp. 1265-1269.
Vladisavljevic et al. "Industrial lab-on-a-chip: Design, applications and scale-up for drug discovery and delivery," Advanced Drug Delivery Reviews, vol. 65, 2013, pp. 1626-1663.
Yu et al., "Microfluidic Methods for Production of Liposomes," Methods in Enzymology, vol. 465, Chapter 7, 2009, pp. 129-141.
International Search Report and Written Opinion in corresponding International Application No. PCT/IB2020/058044, mailed Nov. 16, 2020 (9 pages).
Beheiry et al., "Effect of pre-eclampsia on glomerular filtration rate in Sudanese women," International Journal of Research in Medical Sciences, vol. 5, No. 3, Mar. 2017, pp. 1053-1057.
Garg et al., "Microfluidics: a transformational tool for nanomedicine development and production," Journal of Drug Targeting, vol. 24, No. 9, 2016, pp. 821-835.
Gujrati et al., "Multifunctional pH-Sensitive Amino Lipids for siRNA Delivery," Bioconjugate Chemistry, vol. 27, 2016, pp. 19-35.
Ignatova et al., "Feasibility of scaling from pilot to process scale," Journal of Chromatography A, vol. 1151, 2007, pp. 20-24.
Leung et al., "Microfluidic Mixing: A General Method for Encapsulating Macromolecules in Lipid Nanoparticle Systems," The Journal of Physical Chemistry B, vol. 119, 2015, pp. 8698-8706.

* cited by examiner

JET MIXING LIPID NANOPARTICLE MANUFACTURING PROCESS

FIELD OF THE INVENTION

The present invention relates to methods for manufacturing a lipid nanoparticle comprising a cationic lipid and a nucleic acid molecule using a microfluidic device and related aspects thereof.

BACKGROUND TO THE INVENTION

The delivery of nucleic acids for immunising animals has been a goal for several years. Various approaches have been tested, including the use of DNA or RNA, of viral or non-viral delivery vehicles (or even no delivery vehicle, in a "naked" vaccine), of replicating or non-replicating vectors, or of viral or non-viral vectors. Non-viral delivery vehicles for RNA include liposomes.

Liposomes may be manufactured by a variety of methods by, for instance, mixing an ethanolic solution of the lipids with an aqueous solution of the nucleic acid and buffer. Methods for mixing can include a process in which feed streams of aqueous nucleic acid solution are combined in a single mixing zone with one stream of a lipid-solvent solution. Microfluidic methods for manufacturing liposomes encapsulating RNA (a non-viral delivery system) on a commercially viable scale, as well as microfluidic devices for doing so, are known.

There remains a need for new manufacturing approaches that involve high mixing efficiency which enable manufacturing of RNA-encapsulating liposomes with improved physicochemical characteristics while maintaining scalability and speed.

SUMMARY OF THE INVENTION

Methods for manufacturing a liposome comprising a cationic lipid and a nucleic acid using a microfluidic device and related aspects thereof are provided.

In some embodiments, methods of using a microfluidic device to manufacture a non-viral delivery system comprising a liposome encapsulating at least one RNA are provided. In these aspects, the microfluidic device comprises one or more inlets for a first solution having a total cross-sectional area of m and one or more inlets for a second solution having a total cross-sectional area of n, wherein the first solution comprises a solvent and ionizable cationic lipid molecules, the second solution comprises a plurality of the RNA, and m/n is a positive number of greater than 1. In these embodiments, the method comprises the steps of (a) mixing in the device (i) the first solution, the first solution having a flow rate into the microfluidic device of x and (ii) the second solution, the second solution having a flow rate into the microfluidic device of y, wherein x/y is a positive number of less than 1 and (b) removing the solvent.

DESCRIPTION OF DRAWINGS/FIGURES

FIG. 1 Mixing profile within a chip operating under standard (B,D) and respective improved (B', D') mixing conditions. The imaging was performed with use of digital microscope camera and stained solutions. The three inlet capillaries are visible on the top of the chip and the output capillary is located on the bottom side of the chip (not shown). The fluid flows from the top to the bottom of the mixing chip. In standard mixing conditions (B & D) a clear interface is visible between aqueous and organic phases (edges vs center of the chip) along the full length of the mixing chamber, indicating incomplete/non-efficient mixing at the end. In improved mixing conditions (B' & D'), a complete mixing between the phases is achieved within ¼ to ⅛ of the mixing chamber length (for D' and B' respectively), as indicated by the absence of the aqueous/organic phase interface.

Figure 2A:
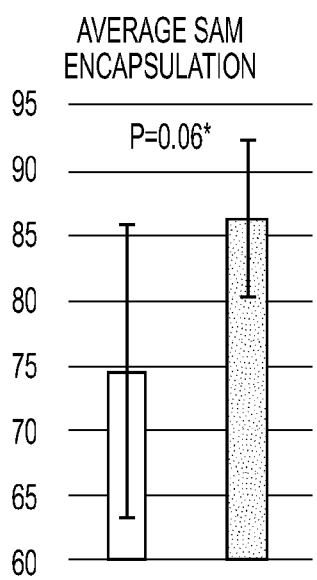
Figure 2B:
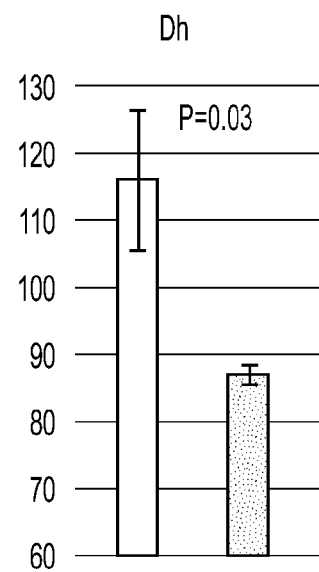
Figure 2C:
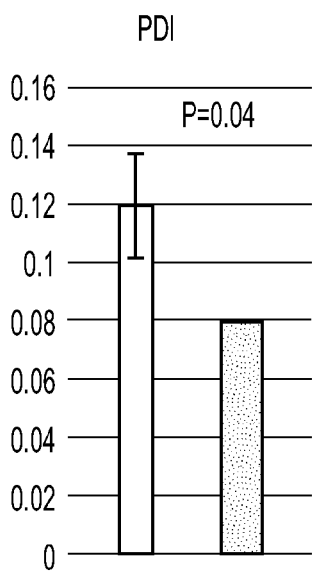

FIG. 2A-FIG. 2C shows improvement in the measured LNP characteristics achieved by applying condition B'. FIG. 2A depicts RNA encapsulation (grey bar=condition B; black bar=condition B'). FIG. 2B depicts hydrodynamic diameter (Dh)(grey bar=condition B; black bar=condition B'). FIG. 2C depicts polydispersity (PDI)(grey bar=condition B; black bar=condition B').

Figure 3:
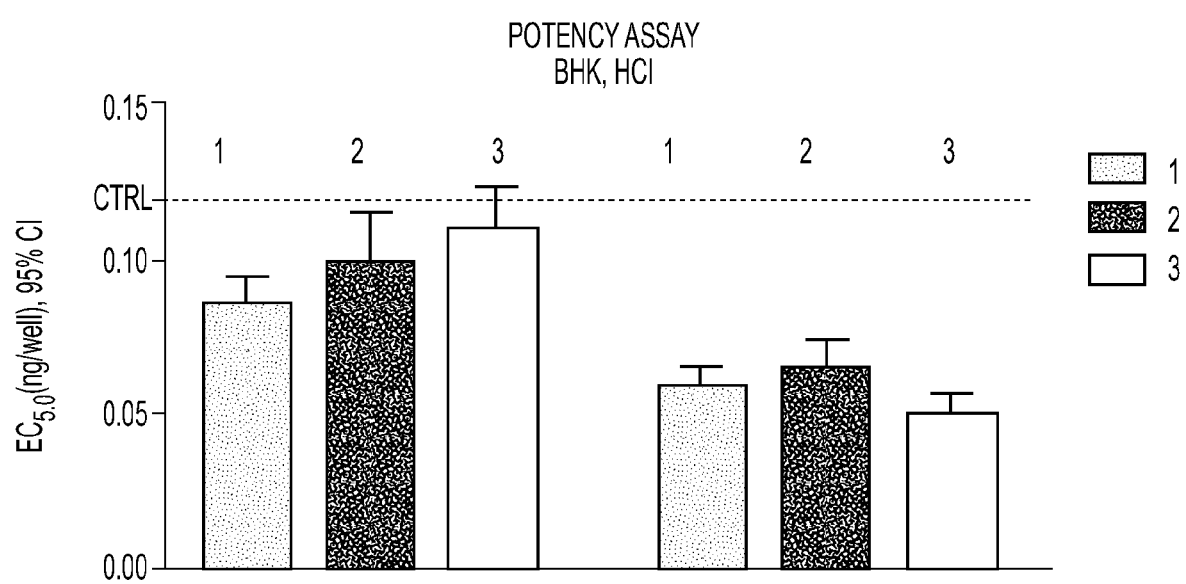

FIG. 3 shows liposomes formulated using condition B (left three bars) vs liposomes formulated using B' (right three bars). Lower EC50 values correspond to higher potency. (Black bar=batch 1; dark grey bar=batch 2; light grey bar=batch 3.)

Figure 4:
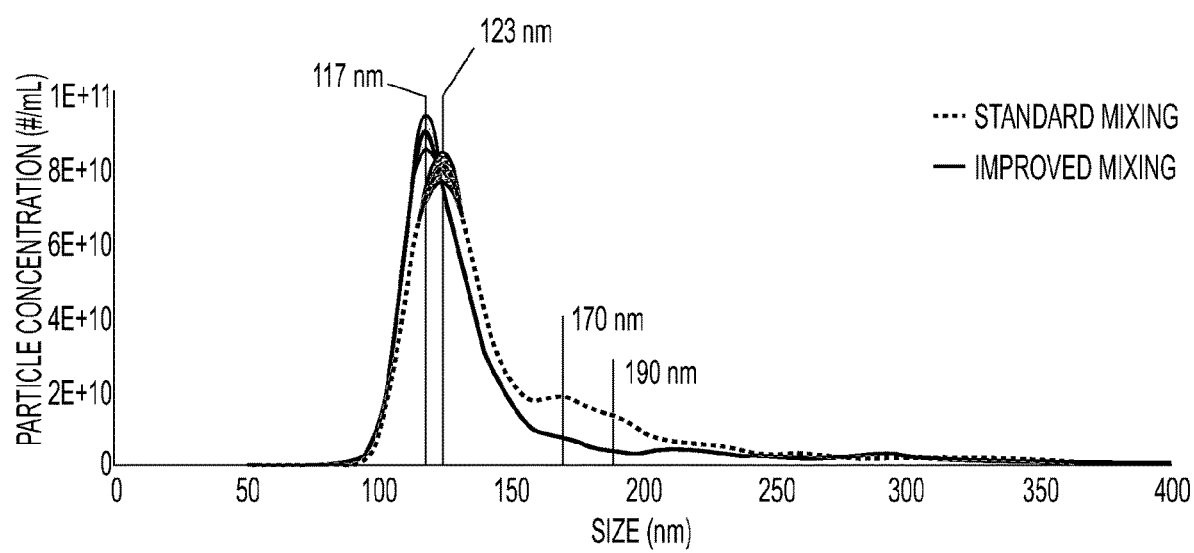

FIG. 4 shows a comparison of size distribution of liposomes produced using condition B (standard mixing) vs liposomes produced using condition B' (improved mixing).

Figure 5A:
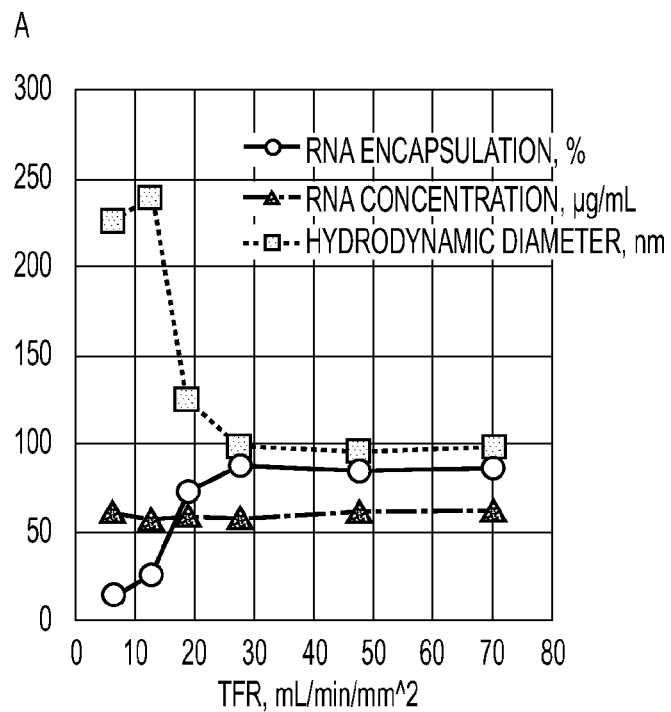
Figure 5B:
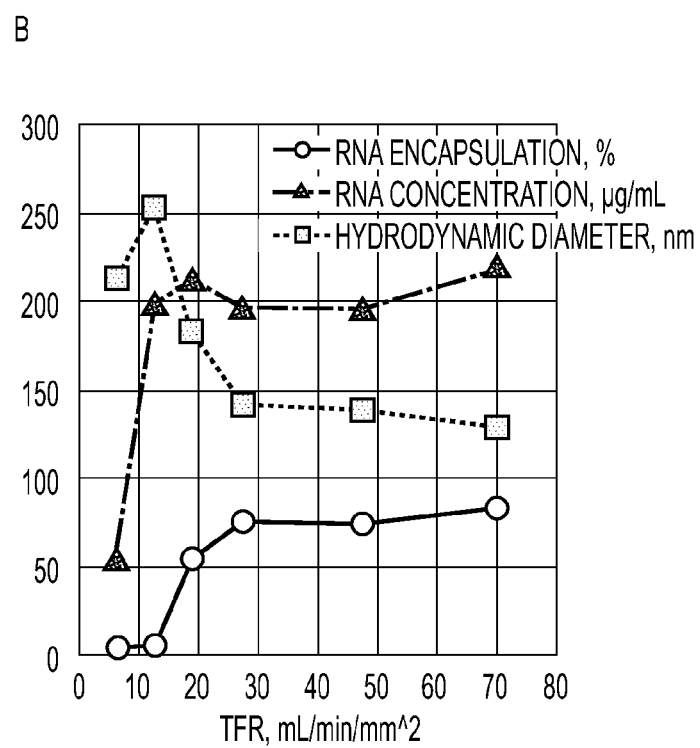

FIG. 5A-FIG. 5B Liposome formulation is possible in a range of Lipid/RNA concentrations, at total flow rates (TFR) higher than 18.75 mL/min/mm². FIG. 5A. Plot of characteristics of liposomal RNA carriers (lipid nanoparticles; LNPs) made at 125 µg/mL RNA concentration (and proportional concentration of lipids) under various combined TFR of aqueous and organic phases; A:O ratio=2. FIG. 5B. Plot of characteristics of liposomal RNA carriers (LNPs) made at 400 µg/mL RNA concentration (and proportional concentration of lipids) under various combined TFR of aqueous and organic phases; A:O ratio=2. Downstream purification and processing of produced liposomes (after mixing process and before characterization process) resulted in significant dilution and effective RNA concentration of ~60 µg/mL and ~200 µg/mL for formulations prepared at 125 µg/mL and 400 µg/mL respectively. RNA encapsulation (circles), RNA concentration (triangles) and hydrodynamic diameter (squares).

DETAILED DESCRIPTION OF THE INVENTION

Definitions

By "flow rate" is intended volumetric flow rate, the volume of solution which passes per unit time. Unless otherwise provided, "total flow rate" means the volume of solution which passes through a chip as described herein having a mixing chamber with a cross-sectional area of 0.8 mm². Where specified, total flow rate may be expressed in mL/min/mm² to account for the scalability of the chip, ie, the total flow rates expressed in mL/min/mm² remains the same even if more than one chip or a chip having a cross-sectional area different than 0.8 mm² are utilized such that the volume of solution passing through chip(s) is increased or decreased. For instance, in one aspect the total flow rate in the mixing chamber may be expressed in mL/min/mm² using the dimensions of the mixing chamber. In another, aspect the total flow rate at the outlet may be expressed in mL/min/mm² using the dimensions of the outlet.

By "hindered ester group" is intended a sterically crowded environment around the C(=O) due to the presence of bulk substituents, such as cyclic or branched moieties.

By "linear velocity" is intended the distance passed within the specified part of the chip by a solution per unit time. For instance, the distance passed within an inlet by the solution per unit time.

By "lipid" is intended a class of organic compounds that are fatty acids or their derivatives and are insoluble in water but soluble in organic solvents, including natural oils, waxes, and steroids (for example, sterols, including cholesterol).

By "liposome" is intended a microvesicle composed of one or more bilayers, or layers, of lipidic amphipathic molecules that may enclose one or more aqueous compartments. Liposomes include lipid nanoparticles (LNP).

Non-Viral Delivery Systems

Liposomes

The methods of manufacturing a non-viral delivery system comprising a liposome encapsulating an RNA utilize a scalable microfluidic device as described elsewhere herein. The invention utilizes liposomes within which polypeptide-encoding RNA is encapsulated. Thus, the RNA is (as in a natural virus) separated from any external medium. Encapsulation within the liposome has been found to protect RNA from RNase digestion. The liposomes can include some external RNA (e.g. on their surface), but at least half of the RNA (such as at least 50%, at least 75%, at least 90%, at least 95%, and ideally all of it) is encapsulated in the liposome's core. Encapsulation within liposomes is distinct from, for instance, the RNA complexes where RNA is mixed with pre-formed liposomes.

Liposomes are usually divided into three groups: multi-lamellar vesicles (MLV); small unilamellar vesicles (SUV); and large unilamellar vesicles (LUV). MLVs have multiple bilayers in each vesicle, forming several separate aqueous compartments. SUVs and LUVs have a single bilayer encapsulating an aqueous core; SUVs typically have a diameter 50 nm, and LUVs have a diameter >50 nm. Liposomes herein are ideally LUVs with a diameter in the range of 60-180 nm, and preferably in the range of 80-160 nm. For a composition comprising a population of LUVs with different diameters: (i) at least 80% by number should have diameters in the range of 20-220 nm, (ii) the average diameter (Zav, by intensity) of the population is ideally less than 140 nm, and/or (iii) a polydispersity index <0.3. If the liposomes herein are not spherical, the term "diameter" refers to a liposome's largest cross-sectional diameter.

Liposomes useful for encapsulating RNA can be formed from a single lipid or from a mixture of lipids, provided that at least one of the lipids has a pKa in the range of 5.0 to 7.6 (and, preferably, a tertiary amine). Within this pKa range, preferred lipids have a pKa of 5.5 to 6. The pKa is the pH at which 50% of the lipids are charged, lying halfway between the point where the lipids are completely charged and the point where the lipids are completely uncharged. It can be measured in various ways, but is preferably measured using the method disclosed below in the section entitled "pKa measurement". The pKa typically should be measured for the lipid alone rather than for the lipid in the context of a mixture which also includes other lipids.

Where a liposome herein is formed from a mixture of lipids, it is preferred that the proportion of those lipids which have a pKa within the desired range should be between 20-80% of the total amount of lipids e.g. between 30-70%, or between 40-60%. The remainder can be made of e.g. cholesterol (e.g. 35-55% cholesterol); and/or DMG (optionally PEGylated) or DMG PE; and/or DSPC. Such mixtures are used below. These % values are mole percentages.

As mentioned above, a liposome may include an amphiphilic lipid whose hydrophilic portion is PEGylated (i.e. modified by covalent attachment of a polyethylene glycol). This modification can increase stability and prevent non-specific adsorption of the liposomes. For instance, lipids can be conjugated to PEG using techniques known in the art. PEG provides the liposomes with a coat which can confer favourable pharmacokinetic characteristics. The combination of efficient encapsulation of a RNA (particularly a self-replicating RNA), a cationic lipid having a pKa in the range 5.0-7.6, and a PEGylated surface, allows for efficient delivery to multiple cell types (including both immune and non-immune cells), thereby eliciting a stronger and better immune response than when using quaternary amines without PEGylation. Various lengths of PEG can be used e.g. between 0.5-8 kDa, including, for example, a PEG2K (PEG2000), i.e., a PEG molecule of roughly 2 kDaltons.

Lipids used with the invention can be saturated or unsaturated. The use of at least one unsaturated lipid for preparing liposomes is preferred. If an unsaturated lipid has two tails, both tails can be unsaturated or it can have one saturated tail and one unsaturated tail.

In some embodiments, the liposomes will comprise a cationic lipid that comprises a headgroup with a tertiary amine (an ionizable cationic lipid). In some embodiments, the cationic lipids herein further comprise at least one hindered ester group; at least one carbonate group; or at least one aromatic group in the core. In some embodiments, the cationic lipid further comprises an unhindered ester group.

Applicants have observed that the biological activity of RNA encapsulated in liposomes comprising certain ionizable cationic lipids is several-fold higher than the same RNA encapsulated in liposomes comprising other ionizable cationic lipids. Thus, the selection of ionizable cationic lipid is an important parameter for generating RNA encapsulated liposomes having satisfactory biological activity. The activity of RNA encapsulated in liposomes can be measured by determining antigen expression in vitro using high content imaging as described in detail elsewhere herein. In brief, regression of the percentage of antigen expressing cells as a function of RNA concentration is carried out to produce an ECK value, the concentration of RNA that produces half-maximal response. In some embodiments, the ionizable cationic lipids suitable for use herein will produce a liposome encapsulated RNA having an $ECH_{50}$ of less than 2.5 ng/well, such as less than 2.4 ng/well, less than 2.3 ng/well, less than 2.2 ng/well, less than 2.1 ng/well, less than 2.0 ng/well, less than 1.9 ng/well, less than 1.8 ng/well, less than 1.7 ng/well, less than 1.6 ng/well, less than 1.5 ng/well, less than 1.4 ng/well, less than 1.3 ng/well, less than 1.2 ng/well, less than 1.1 ng/well, less than 1.0 ng/well, less than 0.9 ng/well, less than 0.8 ng/well, less than 0.7 ng/well, less than 0.6 ng/well, less than 0.5 ng/well, less than 0.4 ng/well, less than 0.3 ng/well, less than 0.25 ng/well, less than 0.20 ng/well, less than 0.15 ng/well, or less than 0.10 ng/well.

In some embodiments, cationic lipids such as, but not limited to, DLinDMA, DLin-KC2-DMA, and DLin-MC3-DMA, re lipids, and others listed in the patent publications WO2013/151664 and WO17049245 may suitably be used in the methods described herein.

In some embodiments, the cationic lipids herein comprise the structure of Formula I:

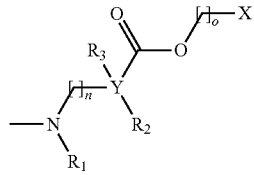

Formula I wherein n=an integer from 1 to 3 and
(i) $R_1$ is $CH_3$, $R_2$ and $R_3$ are both H, and Y is C; or
(ii) $R_1$ and $R_2$ are collectively $CH_2$—$CH_2$ and together with the nitrogen form a five-, six-, or seven-membered heterocycloalkyl, $R_3$ is $CH_3$, and Y is C; or
(iii) $R_1$ is $CH_3$, $R_2$ and $R_3$ are both absent, and Y is C;
wherein o is 0 or 1;
wherein X is:

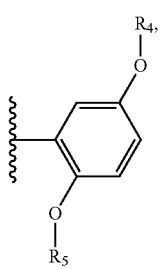

(i)

wherein $R_4$ and $R_5$ are independently a $C_{10-20}$ hydrocarbon chain having one or two cis alkene groups at either or both of the omega 6 and 9 positions; or
(ii) —CH(—$R_6$)—$R_7$, wherein
(1) $R_6$ is —$(CH_2)_p$—O—C(O)—$R_8$ or —$C_p$—$R_8$;
(2) $R_7$ is —$(CH_2)_{p'}$—O—C(O)—$R_8$' or —$C_{p'}$—$R_8$';
(3) p and p' are independently 0, 1, 2, 3 or 4; and
(4) $R_8$ and $R_8'$ are independently a
 (A) —$C_{8-20}$ hydrocarbon chain having one or two cis alkene groups at either or both of the omega 6 and 9 positions;
 (B) —$C_{1-3}$—C(—O—$C_{6-12}$)—O—$C_{6-12}$ saturated or unsaturated hydrocarbon chain;
 (C) —$C_{6-16}$ saturated hydrocarbon chain;
 (D) —C(—$C_{6-16}$)—$C_{6-16}$ saturated or unsaturated hydrocarbon chain;
 (E) —C[—C—O—C(O)—$C_{4-12}$]—C—O—C(O)—$C_{4-12}$ saturated or unsaturated hydrocarbon chain; and
 (F) —$C_{6-16}$ saturated or unsaturated hydrocarbon chain.

In some embodiments, $R_1$ is $CH_3$, $R_2$ and $R_3$ are both H, and Y is C. In some embodiments, $R_1$ and $R_2$ are collectively $CH_2$—$CH_2$ and together with the nitrogen form a five-, six-, or seven-membered heterocycloalkyl, $R_3$ is $CH_3$, and Y is C. In some embodiments, $R_1$ is $CH_3$, $R_2$ and $R_3$ are both absent, and Y is O.

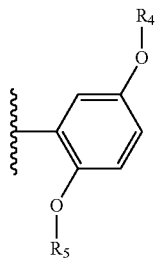

In some embodiments, X is $R_5$ wherein $R_4$ and $R_5$ are independently a $C_{10-20}$ hydrocarbon chain having one or two cis alkene groups at either or both of the omega 6 and 9 positions.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{6-16}$ saturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is —$C_{1-3}$—C(—O—$C_{6-12}$)—O—$C_{6-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{6-16}$ saturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{6-16}$ saturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{6-16}$ saturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —$C_{6-16}$ saturated hydrocarbon chain; and $R_8'$ is a —$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_p$—O—C(O)—$R_8$, $R_7$ is —$(CH_2)_{p'}$—O—C(O)—$R_8'$, p and p' are independently 0, 1, 2, 3 or 4; $R_8$ is a —C(—$C_{6-16}$)—$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_p$—O—C(O)—

$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_{p'}$—O—C(O)—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$(CH_2)_{p'}$—O—C(O)—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{6-16}$ saturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{6-16}$ saturated hydrocarbon chain.

In some embodiments, X is —CH(—$R_6$)—$R_7$, $R_6$ is —$(CH_2)_{p'}$—O—C(O)—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —C(—$C_{6-16}$)—$C_{6-16}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; R$_8$ is a —C$_{6-16}$ saturated hydrocarbon chain; and R$_8$' is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; R$_8$ is a —C$_{6-16}$ saturated hydrocarbon chain; and R$_8$' is a —C$_{6-16}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C(—C$_{6-16}$)—C$_{6-16}$ saturated or unsaturated hydrocarbon chain; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C(—C$_{6-16}$)—C$_{6-16}$ saturated or unsaturated hydrocarbon chain; and R$_8$' is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C(—C$_{6-16}$)—C$_{6-16}$ saturated or unsaturated hydrocarbon chain; and R$_8$' is a —C$_{6-16}$ saturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C(—C$_{6-16}$)—C$_{6-16}$ saturated or unsaturated hydrocarbon chain; and R$_8$' is a —C(—C$_{6-16}$)—C$_{6-16}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C(—C$_{6-16}$)—C$_{6-16}$ saturated or unsaturated hydrocarbon chain; and R$_8$' is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C(—C$_{6-16}$)—C$_{6-16}$ saturated or unsaturated hydrocarbon chain; and R$_8$' is a —C$_{6-16}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8$' is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8$' is a —C$_{6-16}$ saturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8$' is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C[—C—O—C(O)—C$_{4-12}$]—C—O—C(O)—C$_{4-12}$ saturated or unsaturated hydrocarbon chain; and R$_8$' is a —C$_{6-16}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C$_{6-16}$ saturated or unsaturated hydrocarbon chain; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —(CH$_2$)$_{p'}$—O—C(O)—R$_8$, R$_7$ is C$_{p'}$—R$_8$', p and p' are independently 0, 1, 2, 3 or 4; and R$_8$ is a —C$_{6-16}$ saturated or unsaturated hydrocarbon chain; and R$_8$' is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C$_{6-16}$ saturated or unsaturated hydrocarbon chain; and R$_8$' is a —C$_{6-16}$ saturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C$_{6-16}$ saturated or unsaturated hydrocarbon chain; and R$_8$' is a —C(—C$_{6-16}$)—C$_{6-16}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C$_{6-16}$ saturated or unsaturated hydrocarbon chain; and R$_8$' is a —C[—C—O—C(O)—C$_{4-12}$]—C—O—C(O)—C$_{4-12}$ saturated or unsaturated hydrocarbon chain.

In some embodiments, X is —CH(—R$_6$)—R$_7$, R$_6$ is —(CH$_2$)$_{p'}$—O—C(O)—R$_8$, R$_7$ is —C$_{p'}$—R$_8$', p and p' are independently 0, 1, 2, 3 or 4; and R$_8$ is a —C$_{6-16}$ saturated or unsaturated hydrocarbon chain; and R$_8$' is a —C$_{6-16}$ saturated or unsaturated hydrocarbon chain.

In some embodiments, X is —CH(—R$_6$)—R$_7$, R$_6$ is —C$_{p'}$—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C$_{8-20}$ hydrocarbon chain having one or two cis alkene groups at either or both of the omega 6 and 9 positions.

In some embodiments, X is —CH(—R$_6$)—R$_7$, R$_6$ is —C$_{p'}$—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and R$_8$' is a —C$_{1-3}$—C(—O—C$_{6-12}$)—O—C$_{6-12}$ saturated or unsaturated hydrocarbon chain.

In some embodiments, X is —CH(—R$_6$)—R$_7$, R$_6$ is —C$_{p'}$—R$_8$, R$_7$ is —(CH$_2$)$_{p'}$—O—C(O)—R$_8$', p and p' are independently 0, 1, 2, 3 or 4; R$_8$ is a —C$_{8-20}$ hydrocarbon chain having one or two cis alkene groups at either or both of the omega 6 and 9 positions; and $R_8'$ is a $-C_{6-16}$ saturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C(-C_{6-16})-C_{6-16}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{8-20}$ hydrocarbon chain having one or two cis alkene groups at either or both of the omega 6 and 9 positions; and $R_8'$ is a $-C_{6-16}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; $R_8$ is a $-C_{1-3}-C(-O-C_{6-12})-O-C_{6-12}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C_{6-16}$ saturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; $R_8$ is a $-C_{6-16}$ saturated hydrocarbon chain; and $R_8'$ is a $-C_{6-16}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{1-3}-C(-O-C_{6-12})-O-C_{6-12}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{6-16}$ saturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C(-C_{6-16})-C_{6-16}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C[-C-O-C(O)-C_{4-12}]-C-O-C(O)-C_{4-12}$ saturated or unsaturated hydrocarbon chain.

In some embodiments, X is $-CH(-R_6)-R_7$, $R_6$ is $-C_p-R_8$, $R_7$ is $-(CH_2)_{p'}-O-C(O)-R_8'$, p and p' are independently 0, 1, 2, 3 or 4; and $R_8$ is a $-C(-C_{6-16})-C_{6-16}$ saturated or unsaturated hydrocarbon chain; and $R_8'$ is a $-C_{6-16}$ saturated or unsaturated hydrocarbon chain.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; and $R_8$ is a $-C[-C-O-C(O)-C_{4-12}]-C-O-C(O)-C_{4-12}$ saturated or unsaturated hydrocarbon chain; and $R_8'$ is a $-C_{8-20}$ hydrocarbon chain having one or two cis alkene groups at either or both of the omega 6 and 9 positions.

In some embodiments, X is $-CH(-R_6)-R_7$, $R_6$ is $-C_{p'}-R_8$, $R_7$ is $-(CH_2)_{p'}-O-C(O)-R_8'$, p and p' are independently 0, 1, 2, 3 or 4; and $R_8$ is a $-C[-C-O-C$ (O)—$C_{4-12}$]—C—O—C(O)—$C_{4-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —C[—C—O—C(O)—$C_4$-12]—C—O—C(O)—$C_{4-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_{p'}$—$R_8$, $R_7$ is —$(CH_2)_{p'}$—O—C(O)—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—Re)—$R_7$, $R_6$ is —$C_{p'}$—$R_8$, $R_7$ is —$(CH_2)_{p'}$—O—C(O)—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated or unsaturated hydrocarbon chain.

In some embodiments, X is —CH(—Re)—$R_7$, Re is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{8-20}$ hydrocarbon chain having one or two cis alkene groups at either or both of the omega 6 and 9 positions.

In some embodiments, X is —CH(—Re)—$R_7$, Re is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{1-3}$—C(—O—$C_{6-12}$)—O—$C_{6-12}$ saturated or unsaturated hydrocarbon chain.

In some embodiments, X is —CH(—Re)—$R_7$, Re is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{0-16}$ saturated hydrocarbon chain.

In some embodiments, X is —CH(—Re)—$R_7$, Re is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C(—$C_{6-16}$)—$C_{6-16}$ saturated or unsaturated hydrocarbon chain.

In some embodiments, X is —CH(—Re)—$R_7$, Re is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —C[—C—O—C(O)—$C_{4-12}$]—C—O—C(O)—$C_{4-12}$ saturated or unsaturated hydrocarbon chain.

In some embodiments, X is —CH(—Re)—$R_7$, Re is —$C_p$—$R_8$, $R_7$ is —$C_{p'}$—$R_8'$, p and p' are independently 0, 1, 2, 3 or 4; $R_8$ is a —$C_{8-20}$ hydrocarbon chain having one or two cis alkene groups at either or both of the omega 6 and 9 positions; and $R_8'$ is a —$C_{0-16}$ saturated or unsaturated hydrocarbon chain.

In some embodiments, X is —CH(—Re)—$R_7$, Re is —$C_p$—$R_8$, $R_7$—$C_{p'}$—$R_8'$, p and p' are independently 0, 1, 2, 3 or 4; RB is a —$C_{1-3}$—C(—O—$C_{6-12}$)—O—$C_{6-12}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is —$C_{1-3}$—C(—O—$C_{6-12}$)—O—$C_{6-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$—$C_p$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; $R_8$ is a —$C_{1-3}$—C(—O—$C_{6-12}$)—O—$C_{6-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; $R_8$ is a —$C_{6-16}$ saturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C(—$C_{6-16}$)—$C_{6-16}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; and $R_8$ is a —C[—C—O—C(O)—$C_{4-12}$]—C—O—C(O)—$C_{4-12}$ saturated or unsaturated hydrocarbon chain; and $R_8'$ is a —$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —$C_{6-16}$ saturated or unsaturated hydrocarbon chain; and $R_8'$ is a —$C_{8-20}$ hydrocarbon chain having one or two cis alkene groups at either or both of the omega 6 and 9 positions.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —$C_{6-16}$ saturated or unsaturated hydrocarbon chain; and $R_8'$ is a —$C_{1-3}$—C(—O—$C_{6-12}$)—O—$C_{6-12}$ saturated or unsaturated hydrocarbon chain.

In some embodiments, X is —CH(—$R_6$)—$R_7$, $R_6$ is —$C_p$—$R_8$, $R_7$—$C_{p'}$—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —$C_{6-16}$ saturated or unsaturated hydrocarbon chain; and $R_8'$ is a —C(—$C_{6-16}$)—$C_{6-16}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —$C_{6-16}$ saturated or unsaturated hydrocarbon chain; and $R_8'$ is a —C[—C—O—C(O)—$C_{4-12}$]—C—O—C(O)—$C_{4-12}$ saturated or unsaturated hydrocarbon chain.

In some embodiments, X is —CH(—$R_6$)—$R_7$, $R_6$ is —$C_p$—$R_8$, $R_7$ is —$C_{p'}$—$R_8'$, p and p' are independently 0, 1, 2, 3 or 4; and $R_8$ is a —$C_{6-16}$ saturated or unsaturated hydrocarbon chain; and $R_8'$ is a —$C_{6-16}$ saturated or unsaturated hydrocarbon chain.

In some embodiments, an exemplary cationic lipid is RV28 having the following structure:
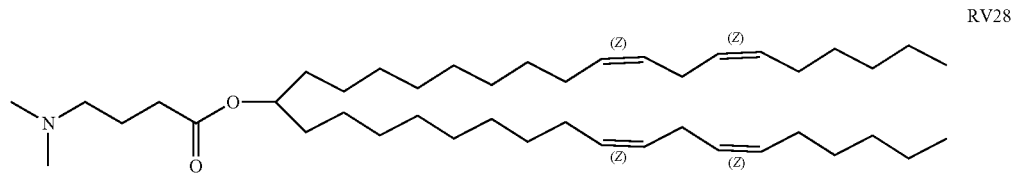 [SMILES: CCCCC/C=C\C/C=C\CCCCCCCCC(CCCCCCCC/C=C\C/C=C\CCCCC)OC(=O)CCCN(C)C]
RV28
In some embodiments, an exemplary cationic lipid is RV31 having the following structure:
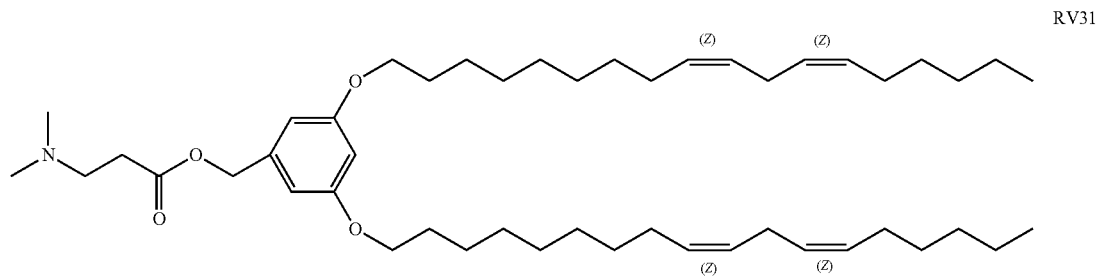 [SMILES: CCCCC/C=C\C/C=C\CCCCCCCCOc1cc(COC(=O)CCN(C)C)cc(OCCCCCCCC/C=C\C/C=C\CCCCC)c1]
RV31
In some embodiments, an exemplary cationic lipid is RV33 having the following structure:
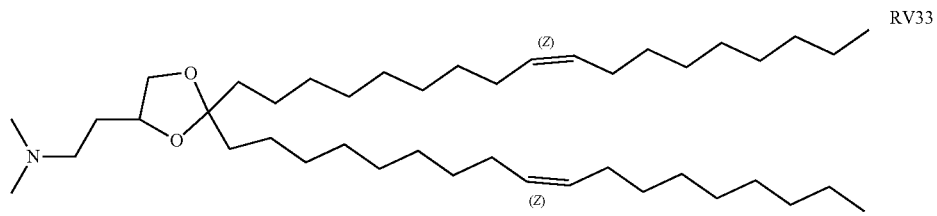 [SMILES: CCCCCCCC/C=C\CCCCCCCCC1(CCCCCCCC/C=C\CCCCCCCC)OCC(CCN(C)C)O1]
RV33
In some embodiments, an exemplary cationic lipid is RV37 having the following structure:
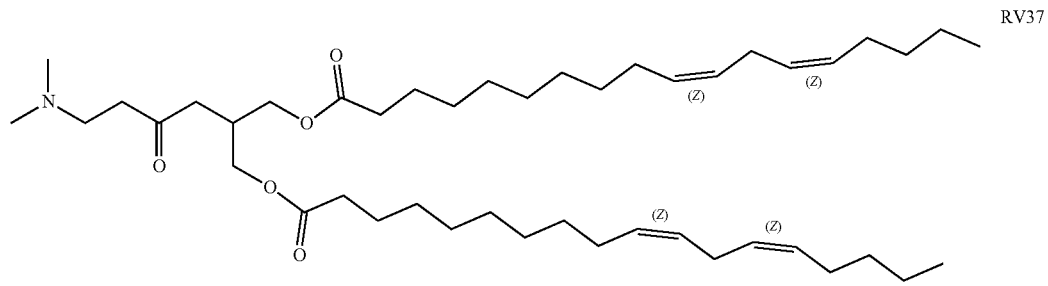 [SMILES: CCCC/C=C\C/C=C\CCCCCCCCC(=O)OCC(COC(=O)CCCCCCCC/C=C\C/C=C\CCCC)CC(=O)CCN(C)C]
RV37

In some embodiments, an exemplary cationic lipid is RV39 having the following structure:
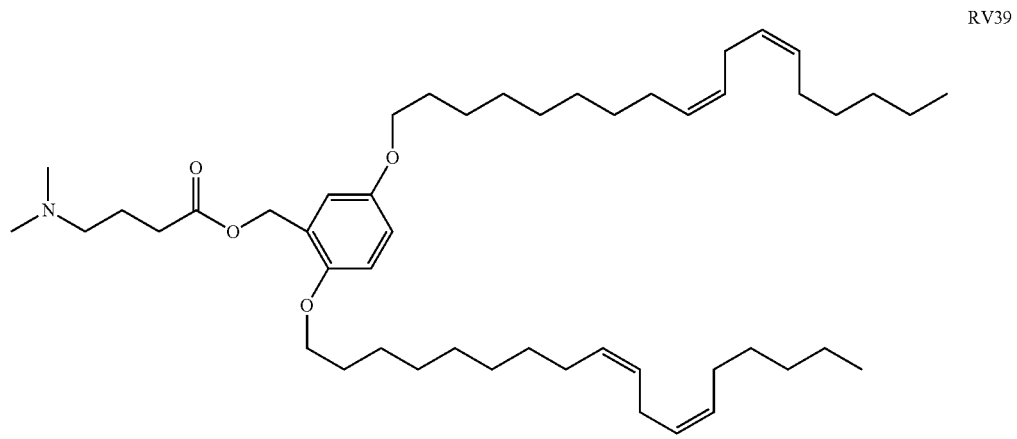 [SMILES: CCCCC/C=C\C/C=C\CCCCCCCCOc1ccc(OCCCCCCCC/C=C\C/C=C\CCCCC)c(COC(=O)CCCN(C)C)c1]
RV39 In some embodiments, an exemplary cationic lipid is RV42 having the following structure:
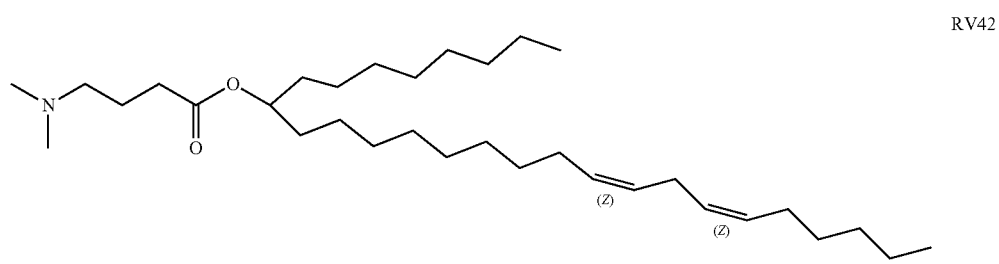 [SMILES: CCCCC/C=C\C/C=C\CCCCCCCCC(CCCCCCCC)OC(=O)CCCN(C)C]
In some embodiments, an exemplary cationic lipid is RV44 having the following structure:
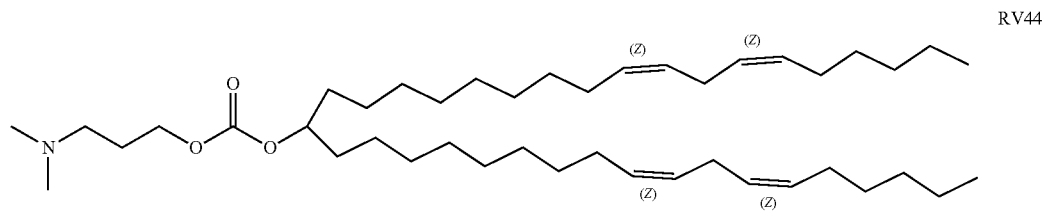 [SMILES: CCCCC/C=C\C/C=C\CCCCCCCCC(CCCCCCCC/C=C\C/C=C\CCCCC)OC(=O)OCCCN(C)C]

In some embodiments, an exemplary cationic lipid is RV73 having the following structure:
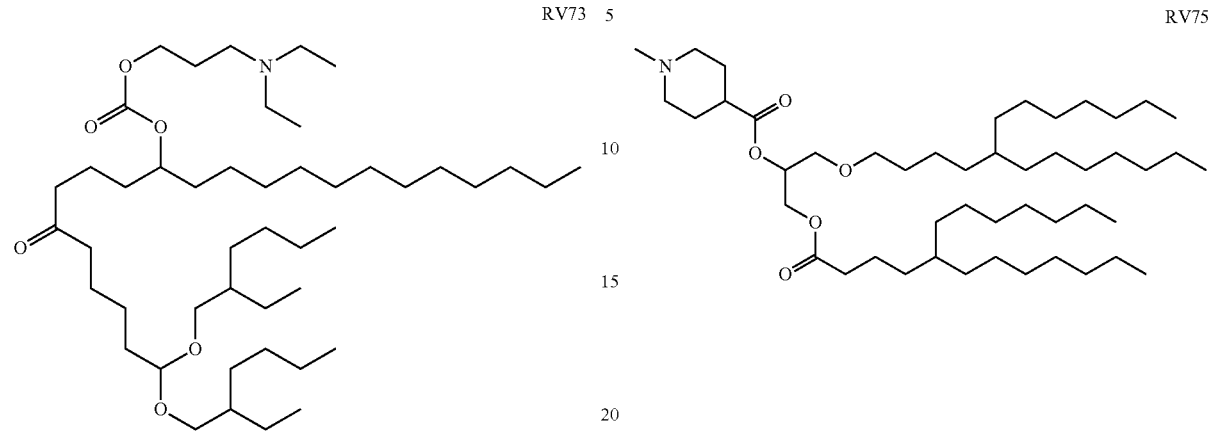
In some embodiments, an exemplary cationic lipid is RV75 having the following structure:
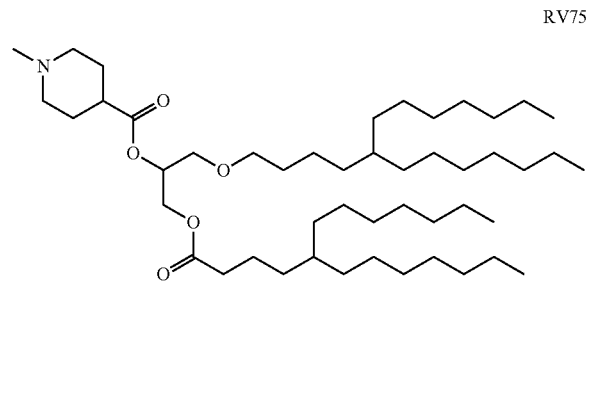 [SMILES: CCCCCCCC(CCCCCCC)CCCCOCC(COC(=O)CCCC(CCCCCCC)CCCCCCC)OC(=O)C1CCN(C)CC1]
In some embodiments, an exemplary cationic lipid is RV81 having the following structure:
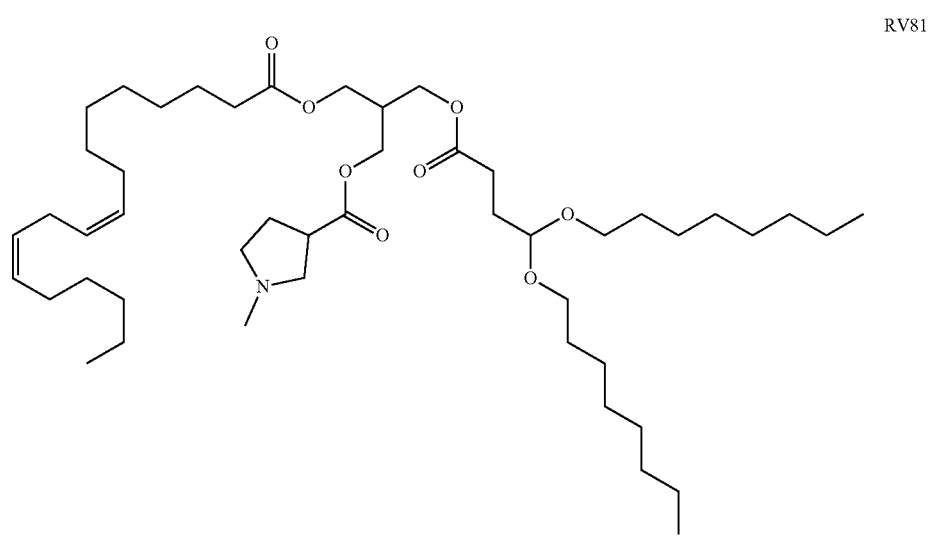 [SMILES: CCCCC/C=C\C/C=C\CCCCCCCC(=O)OCC(COC(=O)CCC(OCCCCCCCC)OCCCCCCCC)COC(=O)C1CCN(C)C1]
In some embodiments, an exemplary cationic lipid is RV84 having the following structure:
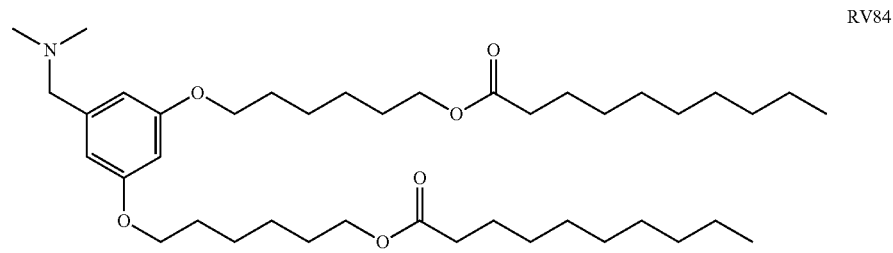 [SMILES: CCCCCCCCCC(=O)OCCCCCCOc1cc(CN(C)C)cc(OCCCCCCOC(=O)CCCCCCCCC)c1]

In some embodiments, an exemplary cationic lipid is RV85 having the following structure:
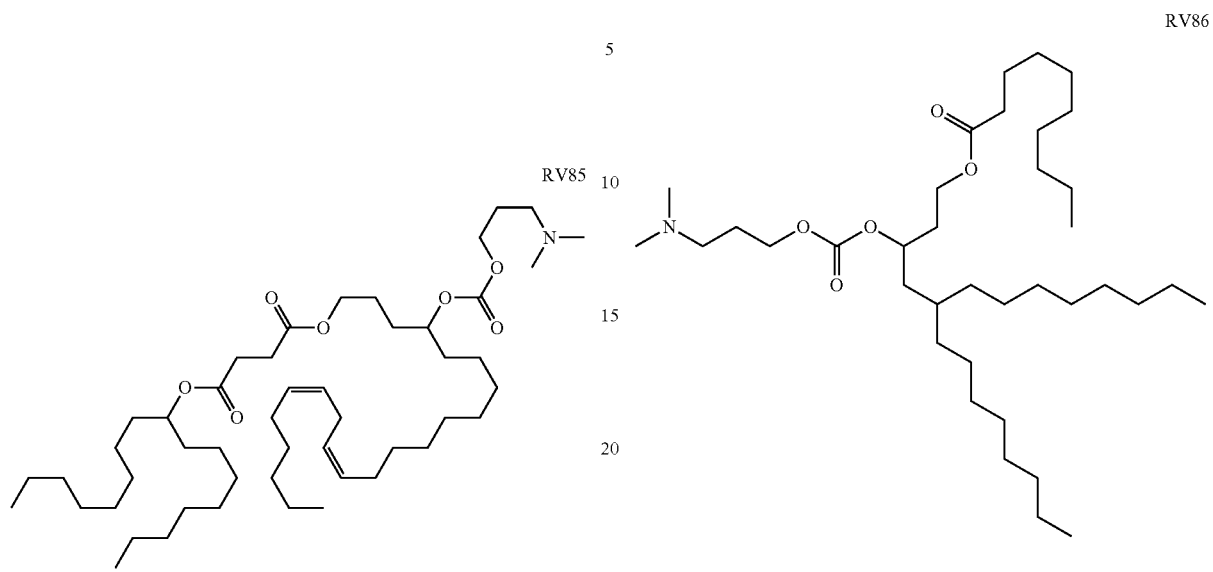
In some embodiments, an exemplary cationic lipid is RV86 having the following structure:
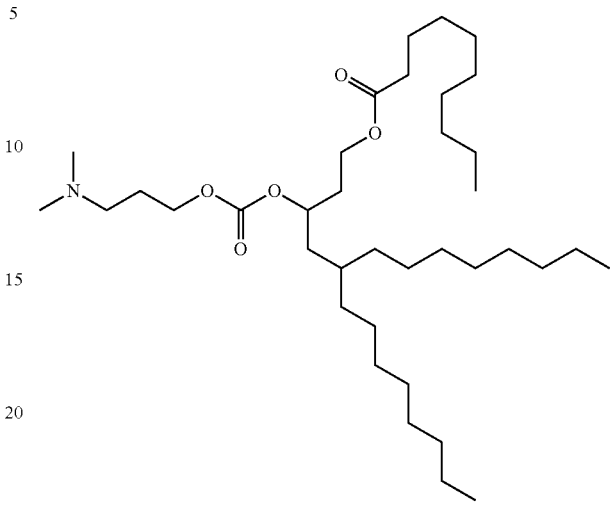
In some embodiments, an exemplary cationic lipid is RV88 having the following structure:
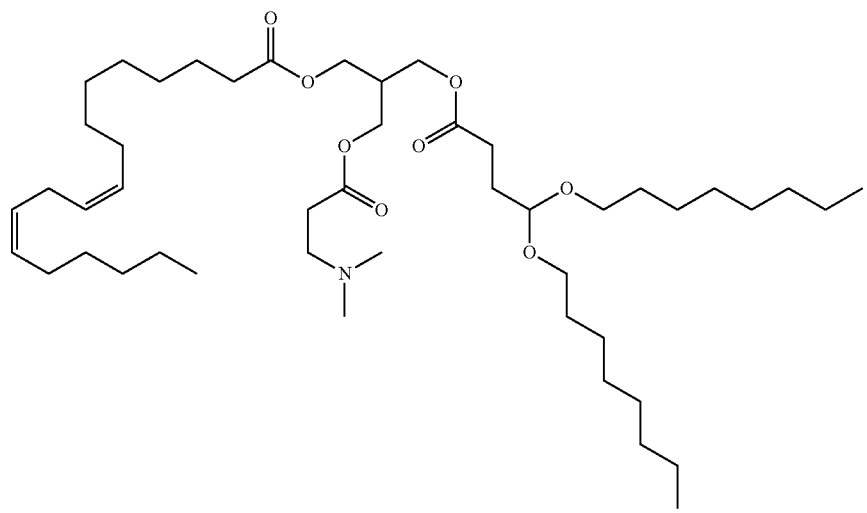
In some embodiments, an exemplary cationic lipid is RV91 having the following structure:
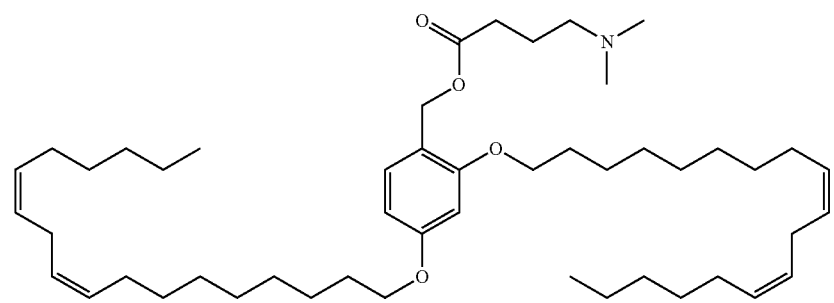

In some embodiments, an exemplary cationic lipid is RV92 having the following structure:
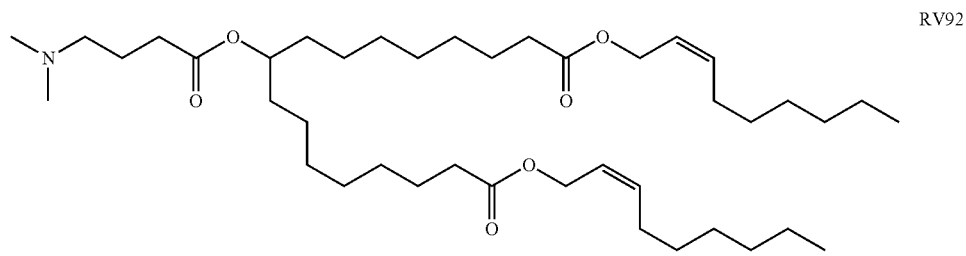 [SMILES: CCCCCC/C=C\COC(=O)CCCCCCCC(CCCCCCCC(=O)OC/C=C\CCCCCC)OC(=O)CCCN(C)C]
In some embodiments, an exemplary cationic lipid is RV93 having the following structure:
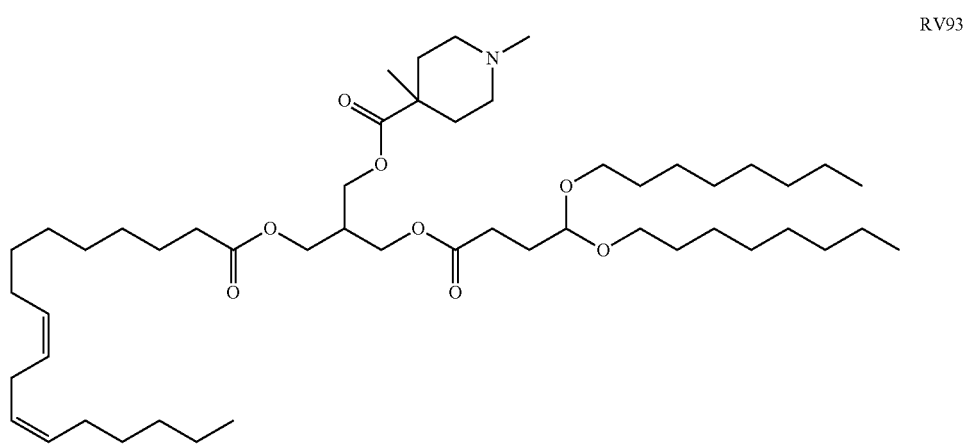 [SMILES: CCCCC/C=C\C/C=C\CCCCCCCC(=O)OCC(COC(=O)CCC(OCCCCCCCC)OCCCCCCCC)COC(=O)C1(C)CCN(C)CC1]
In some embodiments, an exemplary cationic lipid is RV94 having the following structure:
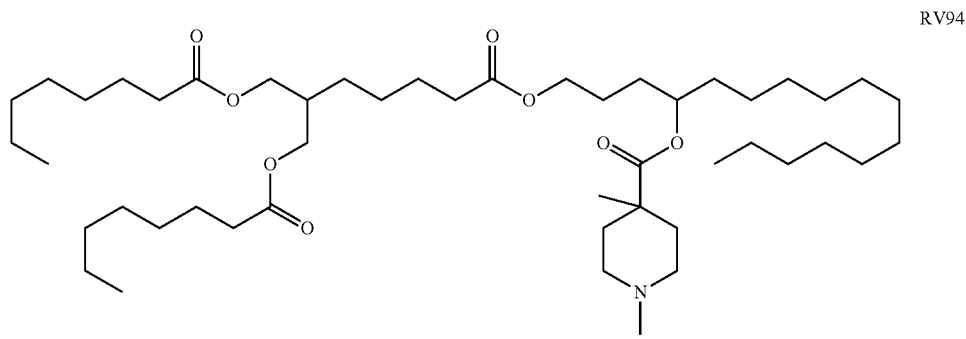 [SMILES: CCCCCCCCCCCCC(CCCOC(=O)CCCCC(COC(=O)CCCCCCC)COC(=O)CCCCCCC)OC(=O)C1(C)CCN(C)CC1]

In some embodiments, an exemplary cationic lipid is RV95 having the following structure:
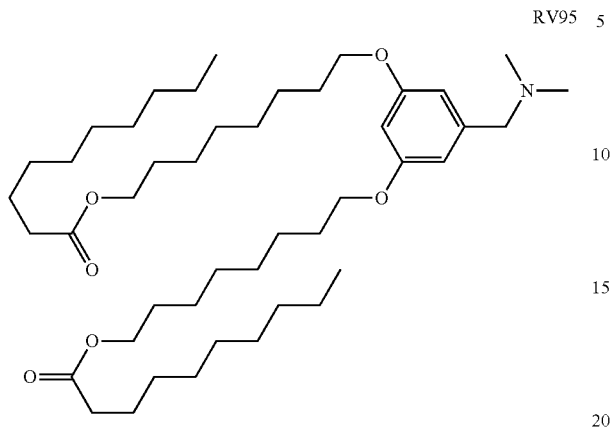
RV95
In some embodiments, an exemplary cationic lipid is RV96 having the following structure:
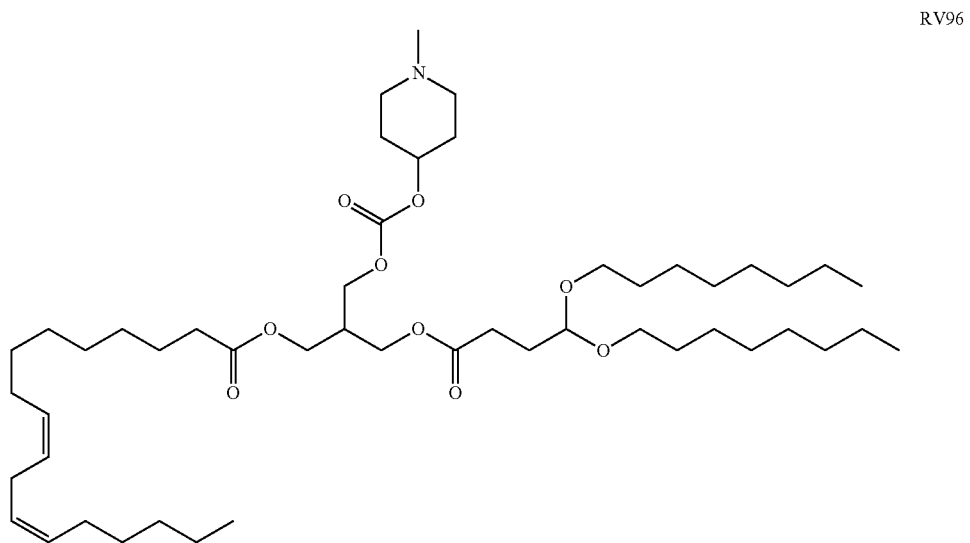 [SMILES: CCCCC/C=C\C/C=C\CCCCCCCC(=O)OCC(COC(=O)CCC(OCCCCCCCC)OCCCCCCCC)COC(=O)OC1CCN(C)CC1]
RV96
In some embodiments, an exemplary cationic lipid is RV97 having the following structure:
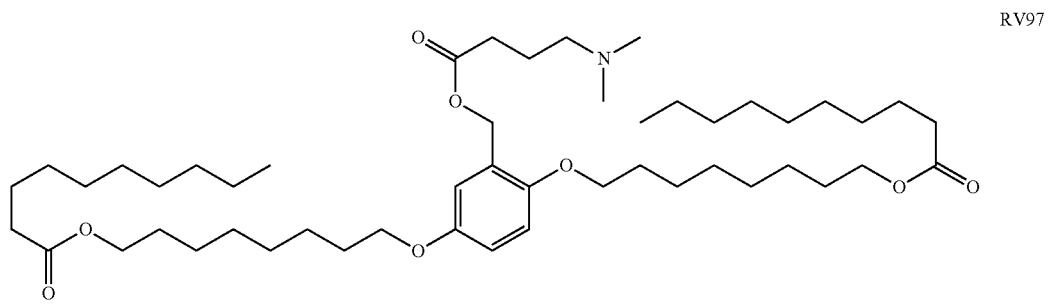 [SMILES: CCCCCCCCCC(=O)OCCCCCCCCOc1ccc(OCCCCCCCCOC(=O)CCCCCCCCC)c(COC(=O)CCCN(C)C)c1]
RV97

In some embodiments, an exemplary cationic lipid is RV99 having the following structure:

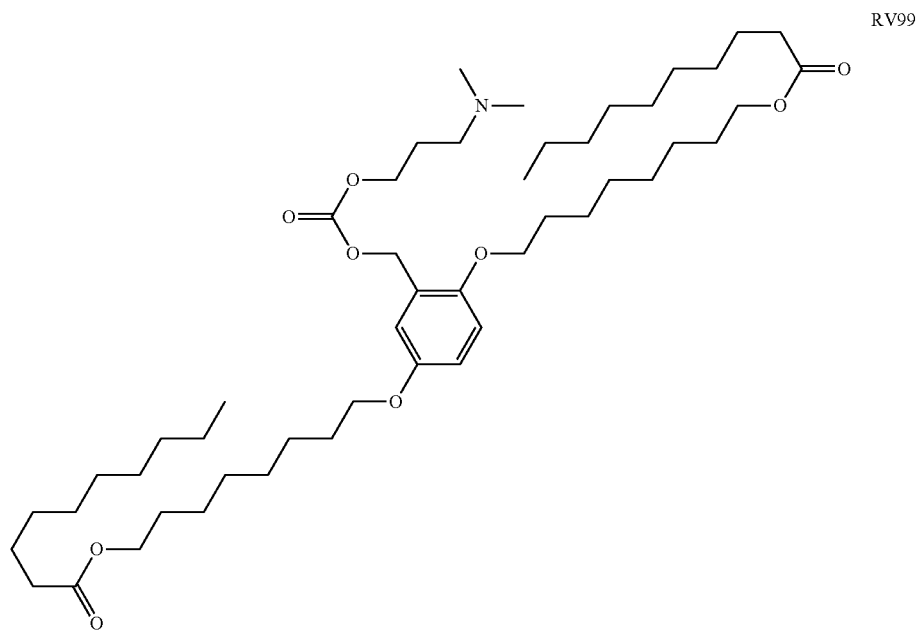 [SMILES: CCCCCCCCCC(=O)OCCCCCCCCOc1ccc(OCCCCCCCCOC(=O)CCCCCCCCC)c(COC(=O)OCCCN(C)C)c1]

In some embodiments, an exemplary cationic lipid is RV101 having the following structure:

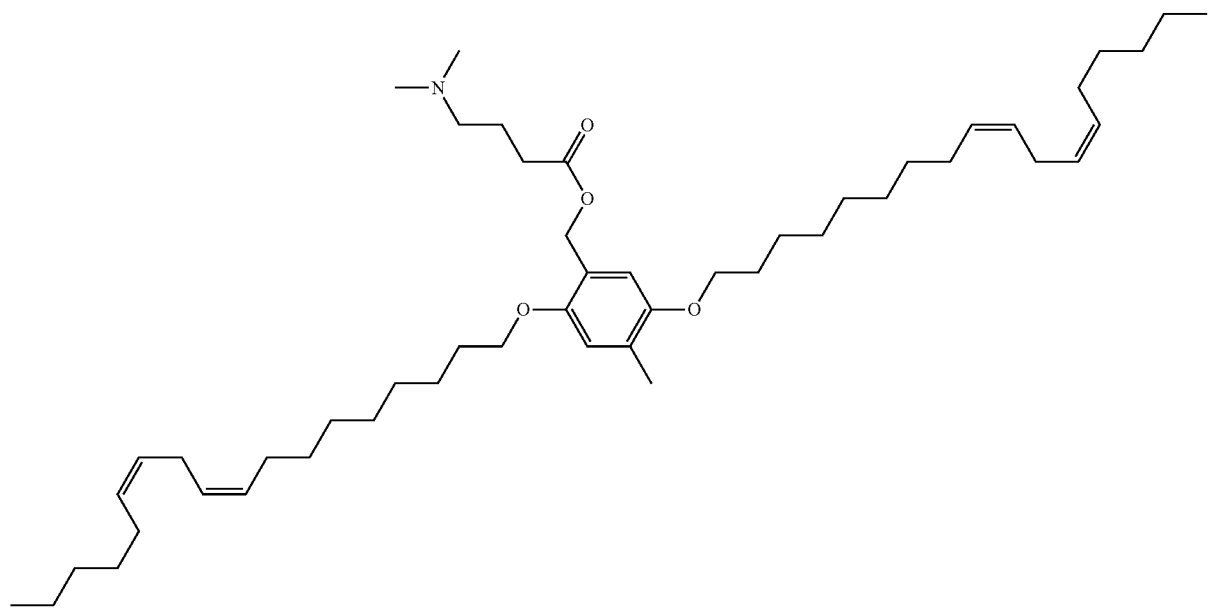

In some embodiments, the cationic lipid is selected from the group consisting of: RV39, RV88, and RV94.

Compositions and methods for the synthesis of compounds having Formula I and RV28, RV31, RV33, RV37, RV39, RV42, RV44, RV73, RV75, RV81, RV84, RV85, RV86, RV88, RV91, RV92, RV93, RV94, RV95, RV96, RV97, RV99, and RV101 can be found in PCT/US2014/070882 (publication number WO/2015/095340) and PCT/US2014/070891 (publication number WO/2015/095346), filed 17 Dec. 2014; as well as PCT/US2015/048535 (publication number WO/2016/037053), filed 4 Sep. 2015.

The liposomes will typically further comprise helper lipids. Useful helper lipids include zwitterionic lipids, such as DPPC, DOPC, DSPC, dodecylphosphocholine, 1,2-dioleoyl-sn-glycero-3-phosphatidylethanolamine (DOPE), and 1,2-diphytanoyl-sn-glycero-3-phosphoethanolamine (DPyPE); sterols, such as cholesterol; and PEGylated lipids, such as PEG-DMPE (PEG-conjugated 1, 2-dimyristoyl-Snglycero-3-phosphoethanolamine-N-[methoxy (polyethylene glycol)]) or PEG-DMG (PEG-conjugated 1,2-Dimyristoyl-sn-glycerol, methoxypolyethylene Glycol). In some embodiments, useful PEGylated lipids may be PEG2K-DMPE (PEG-conjugated 1, 2-dimyristoyl-Sn-glycero-3-phosphoethanolamine-N-[methoxy (polyethylene glycol)-2000]) or PEG2K-DMG (PEG-conjugated 1,2-Dimyristoyl-sn-glycerol, methoxypolyethylene Glycol-2000).

In some embodiments, the methods herein utilize lipids comprising (i) an ionizable cationic lipid having a pKa in the range of 5.0-7.6, (ii) DSPC, (iii) a sterol, and (iv) a PEGylated lipid. In some embodiments, the methods herein utilize lipids consisting essentially of (i) an ionizable cationic lipid having a pKa in the range of 5.0-7.6, (ii) DSPC, (iii) a sterol, and (iv) a PEGylated lipid. In some embodiments, the PEGylated lipid is selected from PEG-PE and PEG-DMG. In some embodiments, the lipids comprise (i) a cationic lipid having Formula I, (ii) DSPC, (ii) a sterol, and (iv) a PEGylated lipid selected from PEG-PE and PEG-DMG. In some embodiments, the lipids consist essentially of (i) a cationic lipid having Formula I, (ii) DSPC, (ii) a sterol, and (iv) a PEGylated lipid selected from PEG-PE and PEG-DMG. In some embodiments, the ionizable cationic lipid has a pKa in the range of 5.5-6.7, 5.7-6.6, 5.9-6.5, 6.0-6.4. In some embodiments, the lipids comprise (i) an ionizable cationic lipid wherein the cationic lipid comprises at least one hindered ester group; at least one carbonate group; or at least one aromatic group in the core, (ii) DSPC, (iii) a sterol, and (iv) a PEG selected from PEG-PE and PEG-DMG. In some embodiments, the lipids consist essentially of (i) an ionizable cationic lipid wherein the cationic lipid comprises at least one hindered ester group; at least one carbonate group; or at least one aromatic group in the core, (ii) DSPC, (iii) a sterol, and (iv) a PEG selected from PEG-PE and PEG-DMG. In some embodiments, the sterol is cholesterol. In some embodiments, the lipids comprise a cationic lipid having Formula I, DSPC, cholesterol, and PEG-DMG. In some embodiments, the lipids comprise a cationic lipid selected from the group consisting of: RV39, RV88, and RV94, DSPC, cholesterol, and PEG-DMG.

The lipids utilized in the methods herein may be prepared by solubilizing individual lipids in solvent and combining the appropriate amount to produce a stock solution of total lipids comprising the calculated percent, ratio, or weight of each lipid. Alternatively, the lipids utilized in the methods herein may be prepared by combining the appropriate amount of each lipid and then solubilizing them in solvent.

In some embodiments of the methods disclosed herein between 20-80%, 30-70%, or 40-60% (mole percent) of total lipids in the solution comprising solvent are cationic. In some embodiments, about 35%, about 40%, about 45%, about 50%, about 55% (mole percent) of total lipids in the solution comprising solvent are cationic.

In some embodiments of the methods disclosed herein between 35-55% or between 40-50% (mole percent) of total lipids in the solution comprising solvent are cholesterol. In some embodiments, about 45%, about 46%, about 47%, about 48%, about 49%, about 50% (mole percent) of total lipids in the solution comprising solvent are cholesterol.

In some embodiments of the methods disclosed herein between 0.5-5% or between 1.0-3.0% (mole percent) of total lipids in the solution comprising solvent are a PEGylated lipid selected PEG-PE and PEG-DMG. In some embodiments, about 1.5%, about 1.6%, about 1.7%, about 1.8%, about 1.9%, about 2.0%, about 2.5% (mole percent) of total lipids in the solution comprising solvent are a PEGylated lipid selected PEG-PE and PEG-DMG.

In some embodiments of the methods disclosed herein between 5-15% or between 7.5-13% (mole percent) of total lipids in the solution comprising solvent are DSPC. In some embodiments, about 8%, about 9%, about 10%, about 11%, about 12% (mole percent) of total lipids in the solution comprising solvent are DSPC.

In some embodiments, the ratio of cationic lipid:(cholesterol+PEGylated lipid+DSPC) (mole:mole) is between 1:5 and 4:5; between 3:10 and 7:10; between 2:5 and 3:5. In some embodiments, the ratio of cholesterol:(cationic lipid+PEGylated lipid+DSPC) (mole:mole) is between 7:20 and 11:20; or between 2:5 and 1:2. In some embodiments, the ratio of PEGylated lipid:(cationic lipid+cholesterol+DSPC) (mole:mole) is between 1:200 and 1:20; or between 1:100 and 3:100. In some embodiments, the ratio of DSPC:(cationic lipid+cholesterol+PEGylated lipid) (mole:mole) is between 1:20 and 3:20; or between 15:200 and 13:100.

The stock solution of lipids plus solvent for use herein is prepared at a convenient concentration of lipids. Advantageously, by increasing the stock solution concentration one may work at a lower volume before nanoprecipitation and the final product can be more concentrated. In some embodiments, the solution comprising solvent further comprises at least 1 mg/mL; at least 2 mg/mL; at least 3 mg/mL; at least 4 mg/mL; at least 5 mg/mL; at least 6 mg/mL; at least 7 mg/mL; at least 8 mg/mL; at least 9 mg/mL; at least 10 mg/mL; at least 15 mg/mL; at least 20 mg/mL of total lipid. In some embodiments, wherein the solution comprising solvent further comprises between 1-20 mg/mL; 1-15 mg/mL; 1-10 mg/mL of total lipid, but no more than 50 mg/mL of total lipid.

The solvent utilized in the solution of lipids is compatible with lipids and miscible with the aqueous solution. In some embodiments, the solvent in the solution of lipids may be a Class 3 solvent, including acetic acid, heptane, acetone, isobutyl acetate, anisole, isopropyl acetate, 1-butanol, methyl acetate, 2-butanol, 3-methyl-1-butanol, butyl acetate, methylethyl ketone, tert-butylmethyl ether, 2-methyl-1-propanol, dimethyl sulfoxide, pentane, ethanol, 1-pentanol, ethyl acetate, 1-propanol, ethyl ether, 2-propanol, ethyl formate, propyl acetate, formic acid, and triethylamine. In some embodiments, the solvent in the solution of lipids may be an organic alcohol. In some embodiments, the solvent comprises between 70-100% ethanol. In some embodiments, the solvent is at least 80%, at least 90%, at least 95%, at least 98%, at least 99% organic alcohol. In some embodiments, the solvent is less than 10%, less than 5%, less than 4%, less than 3%, less than 2%, less than 1%, less than 0.5% water. In some embodiments, the solvent in the solution of lipids is selected from the group consisting of isopropanol and ethanol. In some embodiments, the solvent comprises between 70-100% ethanol. In some embodiments, the solvent is at least 80%, at least 90%, at least 95%, at least 98%, at least 99% ethanol. In some embodiments, the ethanol is less than 10%, less than 5%, less than 4%, less than 3%, less than 2%, less than 1%, less than 0.5% water. In some embodiments, the solvent is 100% ethanol.

The RNA

The invention is useful for in vivo delivery of RNA which encodes an immunogen or other immunologically active molecule, such as an antibody, cytokine, immunoglobulin-related receptor or ligand, and the like. The RNA is translated by non-immune cells at the delivery site, leading to expression of the immunogen or other immunologically active molecule. The non-immune cells may also secrete type I interferons and/or pro-inflammatory cytokines in response to the RNA, as may immune cells when present, which may provide a local adjuvant effect.

The RNA is +-stranded, and so it can be translated by the non-immune cells without needing any intervening replication steps such as reverse transcription. It can also bind to TLR 7 receptors expressed by immune cells, thereby initiating an adjuvant effect.

Preferred +-stranded RNAs are self-replicating. A self-replicating RNA molecule (replicon) can, when delivered to a vertebrate cell even without any proteins, lead to the production of multiple daughter RNAs by transcription from itself (via an antisense copy which it generates from itself). A self-replicating RNA molecule is thus typically a +-strand molecule which can be directly translated after delivery to a cell, and this translation provides a RNA-dependent RNA polymerase which then produces both antisense and sense transcripts from the delivered RNA. Thus, the delivered RNA leads to the production of multiple daughter RNAs. These daughter RNAs, as well as collinear sub genomic transcripts, may be translated themselves to provide in situ expression of an encoded immunogen, or may be transcribed to provide further transcripts with the same sense as the delivered RNA which are translated to provide in situ expression of the immunogen. The overall results of this sequence of transcriptions is a huge amplification in the number of the introduced replicon RNAs and so the encoded immunogen becomes a major polypeptide product of the cells.

As shown below, a self-replicating activity is not required for a RNA to provide an adjuvant effect, although it can enhance post-transfection secretion of cytokines. The self-replicating activity is particularly useful for achieving high level expression of the immunogen by non-immune cells. It can also enhance apoptosis of the non-immune cells.

One suitable system for achieving self-replication is to use an alphavirus-based RNA replicon. These +-stranded replicons are translated after delivery to a cell to give of a replicase (or replicase-transcriptase). The replicase is translated as a polyprotein which auto-cleaves to provide a replication complex which creates genomic −/−strand copies of the +/−strand delivered RNA. These −/−strand transcripts can themselves be transcribed to give further copies of the +/−stranded parent RNA and also to give a sub genomic transcript which encodes the immunogen. Translation of the sub genomic transcript thus leads to in situ expression of the immunogen by the infected cell. Suitable alphavirus replicons can use a replicase from a sindbis virus, a semliki forest virus, an eastern equine encephalitis virus, a venezuelan equine encephalitis virus, etc. Mutant or wild-type virus sequences can be used e.g. the attenuated TC83 mutant of VEEV has been used in replicons.

A preferred self-replicating RNA molecule thus encodes (i) a RNA-dependent RNA polymerase which can transcribe RNA from the self-replicating RNA molecule and (ii) an immunogen. The polymerase can be an alphavirus replicase e.g. comprising one or more of alphavirus proteins nsP1, nsP2, nsP3 and nsP4.

Whereas natural genomes of self-replicating RNA viruses encode structural virion proteins in addition to the non-structural replicase polyprotein, it is preferred that a self-replicating RNA molecule of the invention does not encode structural proteins. Thus, a preferred self-replicating RNA can lead to the production of genomic RNA copies of itself in a cell, but not to the production of RNA containing virions. The inability to produce these virions means that, unlike a wild-type virus, such as an alphavirus, the self-replicating RNA molecule cannot perpetuate itself in infectious form. The alphavirus structural proteins which are necessary for perpetuation in wild-type viruses are absent from self-replicating RNAs of the invention and their place is taken by gene(s) encoding the immunogen of interest, such that the sub genomic transcript encodes the immunogen rather than the structural virion proteins.

Thus, a self-replicating RNA molecule useful with the invention may have two open reading frames. The first (5') open reading frame encodes a replicase; the second (3') open reading frame encodes an immunogen. In some embodiments the RNA may have additional (e.g. downstream) open reading frames e.g. to encode further immunogens (see below) or to encode accessory polypeptides.

A self-replicating RNA molecule can have a 5' sequence which is compatible with the encoded replicase.

Self-replicating RNA molecules can have various lengths but they are typically 5000-25000 nucleotides long e.g. 8000-15000 nucleotides, or 9000-12000 nucleotides. Thus, the RNA is longer than seen in siRNA delivery.

A RNA molecule useful with the invention may have a 5' cap (e.g. a 7-methylguanosine). This cap can enhance in vivo translation of the RNA.

The 5' nucleotide of a RNA molecule useful with the invention may have a 5' triphosphate group. In a capped RNA this may be linked to a 7-methylguanosine via a 5'-to-5' bridge. A 5' triphosphate can enhance RIG-1 binding and thus promote adjuvant effects.

A RNA molecule may have a 3' poly-A tail. It may also include a poly-A polymerase recognition sequence (e.g. AAUAAA) near its 3' end.

A RNA molecule useful with the invention will typically be single-stranded. Single-stranded RNAs can generally initiate an adjuvant effect by binding to TLR7, TLR8, RNA helicases and/or PKR. RNA delivered in double-stranded form (dsRNA) can bind to TLR3, and this receptor can also be triggered by dsRNA which is formed either during replication of a single-stranded RNA or within the secondary structure of a single-stranded RNA.

A RNA molecule useful with the invention can conveniently be prepared by in vitro transcription (IVT). IVT can use a (cDNA) template created and propagated in plasmid form in bacteria, or created synthetically (for example by gene synthesis and/or polymerase chain-reaction (PCR) engineering methods). For instance, a DNA-dependent RNA polymerase (such as the bacteriophage T7, T3 or SP6 RNA polymerases) can be used to transcribe the RNA from a DNA template. Appropriate capping and poly-A addition reactions can be used as required (although the replicon's poly-A is usually encoded within the DNA template). These RNA polymerases can have stringent requirements for the transcribed 5' nucleotide(s) and in some embodiments these requirements must be matched with the requirements of the encoded replicase, to ensure that the IVT-transcribed RNA can function efficiently as a substrate for its self-encoded replicase.

The self-replicating RNA can include (in addition to any 5' cap structure) one or more nucleotides having a modified nucleobase. Thus the RNA can comprise m5C (5-methylcytidine), m5U (5-methyluridine), m6A (N6-methyladenosine), s2U (2-thiouridine), Urn(2'-0-methyluridine), mIA (1-methyladenosine); m2A (2-methyladenosine); Am (2'-0-methyladenosine); ms2m6A (2-methylthio-N6-methyladenosine); i6A (N6-isopentenyladenosine); ms2i6A (2-methylthio-N6isopentenyladenosine); io6A (N6-(cis-hydroxyisopentenyl)adenosine); ms2io6A (2-methylthio-N6-(cis-hydroxyisopentenyl) adenosine); g6A (N6-glycinylcarbamoyladenosine); t6A (N6-threonyl carbamoyladenosine); ms2t6A (2-methylthio-N6-threonyl carbamoyladenosine); m6t6A (N 6-methyl-N 6-threonylcarbamoyladenosine); hn6A(N 6.-30 hydroxynorvalylcarbamoyl adenosine); ms2hn6A (2-methylthio-N6-hydroxynorvalyl carbamoyladenosine); Ar(p) (2'-0-ribosyladenosine (phosphate)); I (inosine); mII (1-methylinosine); m'Im (1,2'-0-dimethylinosine); m3C (3-methylcytidine); Cm (2T-O-methylcytidine); s2C (2-thiocytidine); ac4C (N4-acetylcytidine); f5C (5-fonnylcytidine); m5 Cm (5,2-O-dimethylcytidine); ac4 Cm (N4acetyl2TOmethylcytidine); k2C (lysidine); mIG (1-methylguanosine); 35 m2G (N2-methylguanosine); m7G (7-methylguanosine); Gm (2'-0-methylguanosine); m22G (N2,N2-dimethylguanosine); m2 Gm (N2,2'-0-dimethylguanosine); m22 Gm (N2,N2,2'-0-trimethylguanosine); Gr(p) (2'-0-ribosylguanosine (phosphate)); yW (wybutosine); o2yW (peroxywybutosine); OHyW (hydroxywybutosine); OHyW* (undermodified hydroxywybutosine); imG (wyosine); mimG (methylguanosine); Q (queuosine); oQ (epoxyqueuosine); galQ (galtactosylqueuosine); manQ (mannosyl-queuosine); preQo (7-cyano-7-deazaguanosine); preQi (7-aminomethyl-7-deazaguanosine); G (archaeosine); D (dihydrouridine); m5Um (5,2'-0-dimethyluridine); s4U (4-thiouridine); m5s2U (5-methyl-2-thiouridine); s2Um (2-thio-2'-0-methyluridine); acp3U (3-(3-amino-3-carboxypropyl)uridine); ho5U (5-hydroxyuridine); mo5U (5-methoxyuridine); cmo5U (uri dine 5-oxyacetic acid); mcmo5U (uri dine 5-oxyacetic acid methyl ester); chm5U (5-(carboxyhydroxymethyl)uridine)); mchm5U (5-(carboxyhydroxymethyl)uridine methyl ester); mcm5U (5-methoxycarbonyl methyluridine); mcm5Um (S-methoxycarbonylmethyl-2-O-methyluridine); mcm5s2U (5-methoxycarbonylmethyl-2-thiouridine); nm5s2U (5-aminomethyl-2-thiouridine); mnm5U (5-methylaminomethyluridine); mnm5s2U (5-methylaminomethyl-2-thiouridine); mnm5 se2U (5-methylaminomethyl-2-selenouridine); ncm5U (5-carbamoylmethyluridine); ncm5Um (5-carbamoylmethyl-2'-0-methyluridine); cmnm5U (5-carboxymethylaminomethyluridine); cnmm5Um (5-carboxymethylaminomethyl-2-LOmethyluridine); cmnm5s2U (5-carboxymethylaminomethyl-2-thiouridine); m62A (N6,N6-dimethyladenosine); Tm (2'-0-methylinosine); m4C (N4-methylcytidine); m4Cm (N4,2-O-dimethylcytidine); hm5C (5-hydroxymethylcytidine); m3U (3-methyluridine); cm5U (5-carboxymethyluridine); m6Am (N6,T-0-dimethyladenosine); rn62Am (N6,N6,0-2-trimethyladenosine); m2'7G (N2, 7-dimethylguanosine); m2'2'7G (N2,N2, 7-trimethylguanosine); m3Um (3,2T-0-dimethyluridine); m5D (5-methyldihydrouridine); f5Cm (5-formyl-2'-0-methylcytidine); mI Gm (1, 2'-0-dimethylguanosine); m'Am (1,2-O-dimethyl adenosine) irinomethyluridine); tm5s2U (S-taurinomethyl-2-thiouridine); imG-I4 (4-demethyl guanosine); imG2 (isoguanosine); or ac6A (N6-acetyladenosine), hypoxanthine, inosine, 8-oxo-adenine, 7-substituted derivatives thereof, dihydrouracil, pseudouracil, 2-thiouracil, 4-thiouracil, 5-aminouracil, 5-(C I-C6)-alkyluracil, 5-methy luracil, 5-($C_2$-$C_6$)-alkenyluracil, 5-(C2-C6)-alkynyluracil, 5-(hydroxymethyl)uracil, 5-chlorouracil, 5-fluorouracil, 5-bromouracil, 5-hydroxycytosine, 5-(C1-C6)-alkylcytosine, 5-methylcytosine, 5-(C2-C6)-alkenylcytosine, 5-(C2-C6)-alkynylcytosine, 5-chlorocytosine, 5-fluorocytosine, 5-bromocytosine, N2-dimethylguanine, 7-deazaguanine, 8-azaguanine, 7-deaza-7-substituted guanine, 7-deaza-7(C2-C6)alkynylguanine, 7-deaza-8-substituted guanine, 8-hydroxyguanine, 6-thioguanine, 8-oxoguanine, 2-aminopurine, 2-amino-6-chloropurine, 2,4-diaminopurine, 2,6-diaminopurine, 8-azapurine, substituted 7-deazapurine, 7-deaza-7-substituted purine, 7-deaza-8-substituted purine, or an abasic nucleotide. For instance, a self-replicating RNA can include one or more modified pyrimidine nucleobases, such as pseudouridine and/or 5-methylcytosine residues. In some embodiments, however, the RNA includes no modified nucleobases, and may include no modified nucleotides i.e. all of the nucleotides in the RNA are standard A, C, G and U ribonucleotides (except for any 5' cap structure, which may include a 7'-methylguanosine). In other embodiments, the RNA may include a 5' cap comprising a 7'-methylguanosine, and the first 1, 2 or 3 5' ribonucleotides may be methylated at the 2' position of the ribose.

A RNA used with the invention ideally includes only phosphodiester linkages between nucleosides, but in some embodiments it can contain phosphoramidate, phosphorothioate, and/or methylphosphonate linkages.

Ideally, a liposome includes fewer than 10 different species of RNA e.g. 5, 4, 3, or 2 different species; most preferably, a liposome includes a single RNA species i.e. all RNA molecules in the liposome have the same sequence and same length.

The amount of RNA per liposome can vary. The number of individual self-replicating RNA 10 molecules per liposome is typically ≤50 e.g. <20, <10, <5, or 1-4 per liposome.

RNA molecules used with the invention encode a polypeptide immunogen. After administration of the liposomes the RNA is translated in vivo and the immunogen can elicit an immune response in the recipient. The immunogen may elicit an immune response against a bacterium, a virus, a fungus or a parasite (or, in some embodiments, against an allergen; and in other embodiments, against a tumor antigen). The immune response may comprise an antibody response (usually including IgG) and/or a cell-mediated immune response (e.g. a CD4 and/or CD8 T cell response). The polypeptide immunogen will typically elicit an immune response which recognises the corresponding bacterial, viral, fungal or parasite (or allergen or tumour) polypeptide, but in some embodiments the polypeptide may act as a mimotope to elicit an immune response which recognises a bacterial, viral, fungal or parasite saccharide. The immunogen will typically be a surface polypeptide e.g. an adhesin, a hemagglutinin, an envelope glycoprotein, a spike glycoprotein, etc.

Self-replicating RNA molecules can encode a single polypeptide immunogen or multiple polypeptides. Multiple immunogens can be presented as a single polypeptide immunogen (fusion polypeptide) or as separate polypeptides. If immunogens are expressed as separate polypeptides then one or more of these may be provided with an upstream IRES or an additional viral promoter element. Alternatively, multiple immunogens may be expressed from a polyprotein that encodes individual immunogens fused to a short autocatalytic protease (e.g. foot-and-mouth disease virus 2A protein), or as inteins.

In some embodiments of the methods herein, the RNA is a mRNA of at least 500 nucleotides, at least 1000 nucleotides, at least 1500 nucleotides, at least 2000 nucleotides, at least 2500 nucleotides, at least 3000 nucleotides, at least 3500 nucleotides, at least 4000 nucleotides, at least 4500 nucleotides, at least 5000 nucleotides, at least 5500 nucleotides, at least 6000 nucleotides, at least 6500 nucleotides, at least 7000 nucleotides, at least 7500 nucleotides, at least 8000 nucleotides, at least 8500 nucleotides, at least 9000 nucleotides, or more. In some embodiments of the methods herein, the RNA is a self-replicating RNA of at least 500 nucleotides, at least 1000 nucleotides, at least 1500 nucleotides, at least 2000 nucleotides, at least 2500 nucleotides, at least 3000 nucleotides, at least 3500 nucleotides, at least 4000 nucleotides, at least 4500 nucleotides, at least 5000 nucleotides, at least 5500 nucleotides, at least 6000 nucleotides, at least 6500 nucleotides, at least 7000 nucleotides, at least 7500 nucleotides, at least 8000 nucleotides, at least 8500 nucleotides, at least 9000 nucleotides, or more.

The RNA for use herein is prepared in an aqueous solution comprising water. The aqueous solution may further comprise excipients suitable for use with RNA. In some embodiments, the solution of RNA comprises citrate buffer.

General Parameters for Producing Liposomes Encapsulating RNA

As mentioned above, a process for preparing a RNA-containing liposome may comprise the steps of: (a) mixing RNA with a lipid at a pH which is below the lipid's pKa but is above 4.5; then (b) increasing the pH to be above the lipid's pKa. Thus a cationic lipid is positively charged during liposome formation in step (a), but the pH change thereafter means that the majority (or all) of the positively charged groups become neutral. This process is advantageous for preparing liposomes encapsulating RNA. By avoiding a pH below 4.5 during step (a) the stability of the encapsulated RNA is improved. The pH in step (a) is above 4.5, and is ideally above 4.8. Using a pH in the range of 5.0 to 6.0, or in the range of 5.0 to 5.5, can provide suitable liposomes. The increased pH in step (b) is above the lipid's pKa. The pH is ideally increased to a pH less than 9, and preferably less than 8. Depending on the lipid's pKa, the pH in step (b) may thus be increased to be within the range of 6 to 8 e.g. to pH 6.5±0.3. The pH increase of step (b) can be achieved by transferring the liposomes into a suitable buffer e.g. into phosphate-buffered saline. The pH increase of step (b) is ideally performed after liposome formation has taken place. RNA used in step (a) can be in aqueous solution, for mixing with an organic solution of the lipid (e.g. an ethanolic solution. The mixture can then be diluted to form liposomes, after which the pH can be increased in step (b).

The choice of device for mixing can impact the limits of the achievable average diameter (Zav, by intensity) of the population and/or polydispersity index. Certain devices also impact the capacity for safe, convenient and cost effective production of liposome-encapsulated nucleic acid on a commercially viable scale while preserving the physicochemical characteristics that maintain immunological performance.

Microfluidic Devices

A microfluidic device is a fluid handing apparatus wherein typically at least one aspect has a dimension on a sub-mm scale and typically mixing occurs through passive means (i.e. through contact of fluid streams and without moving parts within the mixing chamber). The microfluidic device will comprise a mixing chamber within which the first solution and second solution are mixed.

The mixing chamber will typically have a cross-sectional area which is 25.6 mm$^2$ or less, such as 12.8 mm$^2$ or less, suitably 6.4 mm$^2$ or less, especially 3.2 mm$^2$ or less and in particular 1.6 mm$^2$ or less. The mixing chamber will typically have a cross-sectional area which is 0.1 mm$^2$ or more, suitably 0.2 mm$^2$ or more, especially 0.3 mm$^2$ or more and in particular 0.4 mm$^2$ or more. In some embodiments the mixing chamber will have a cross-sectional area which is 0.2-3.2 mm$^2$, such as 0.4-1.6 mm$^2$, especially 0.6-1.2 mm$^2$ and in particular 0.7-1.0 mm$^2$ (e.g. 0.8 mm$^2$).

The cross-section of the mixing chamber may be of any shape, though is typically symmetrical. The cross-section may be substantially rectangular (such as square). The cross-section may be elongate in nature, with the larger dimension being at least twice that of the perpendicular dimension, such as at least three times or at least four times. The larger dimension may be no more than ten times that of the perpendicular dimension, such as no more than eight times or no more than six times. The larger dimension will usually be two to ten times that of the perpendicular dimension, such as three to eight times, especially four to six times, in particular five times.

A rectangular cross-section may have a long side of 1-8 mm, such as 1-4 mm, for example 1.4-3.2 mm, especially 1.6-2.4 mm, in particular 1.8-2.2 mm (e.g. 2 mm). A rectangular cross-section may have a short side of 0.1 to 4 mm, for example, 0.1 to 2 mm, optionally 0.1-1.2 mm, such as 0.1-0.8 mm, especially 0.2-0.6 mm, in particular 0.3-0.5 mm (e.g. 0.4 mm).

The microfluidic device will have at least one inlet (such as one inlet) to the mixing chamber for delivery of the first solution. The device may have a plurality of inlets to the mixing chamber for delivery of the first solution, such as two inlets.

The microfluidic device will have at least one inlet to the mixing chamber for delivery of the second solution. The device may have a plurality of inlets to the mixing chamber for delivery of the second solution, such as two inlets.

The one or more inlets for the first solution will have a total cross-sectional area of m and the one or more inlets for the second solution will have a total cross-sectional area of n. The result of m/n is a positive number of greater than 1.

To facilitate adequate mixing, the number of inlets for the first solution and second solution may be increased for mixing chambers with larger cross-sectional areas. In some embodiments, there are twice as many inlets for the first solution as inlets for the second solution. In some embodiments, two of the inlets for the first solution have a neighboring inlet on only one side.

The cross-section of the inlets may be of any shape, though is typically symmetrical. The cross-section may be rectangular (such as square).

Each inlet will typically have a cross-sectional area which is 1.28 mm$^2$ or less, suitably 0.64 mm$^2$ or less, especially 0.32 mm$^2$ or less and in particular 0.16 mm$^2$ or less. Each inlet will typically have a cross-sectional area which is 0.01 mm$^2$ or more, suitably 0.02 mm$^2$ or more, especially 0.03 mm$^2$ or more and in particular 0.04 mm$^2$ or more. In some embodiments each inlet will have a cross-sectional area which is 0.02-0.32 mm$^2$, such as 0.04-0.16 mm$^2$, especially 0.06-0.12 mm$^2$ and in particular 0.07-0.10 mm$^2$ (e.g. 0.08 mm$^2$).

The total cross-sectional area of all inlets will suitably be less than 70% of the cross-sectional area of the mixing chamber, such as less than 60% and especially less than 50%.

Conveniently, the inlets may span the full length of one side of the mixing chamber.

The shape and size of each inlet may be varied independently. However, typically inlets for the first solution will be identical in shape and size, and inlets for the second solution will be identical in shape and size. Conveniently, all inlets are identical in shape and size. A particular inlet design is rectangular in shape, 0.2 mm wide and spanning the full length of the other side of the mixing chamber (e.g. 0.4 mm high)

The inlets will typically be located such that the direction of flow of the first solution and second solution into the mixing chamber is substantially parallel (e.g. within 15 degrees, such as within 10 degrees, in particular within 5 degrees), such as parallel, to the general direction of flow through the mixing chamber. Microfluidic devices as described herein thus do not include apparati in which the direction of flow of the first solution and second solution into the mixing chamber are opposed, such as a Tee-junction or Tee-mixer.

The microfluidic device will have at least one outlet from the mixing chamber for recovery of the mixed material. The device may have a plurality of outlets from the mixing chamber for recovery of the mixed material, such as two or three outlets, which are later combined. Suitably the device will have a single outlet from the mixing chamber for recovery of the mixed material.

The cross-section of the outlets may be of any shape, though is typically symmetrical. The cross-section may be rectangular (such as square), typically having an area of 0.2-1 mm2, such as 0.3-0.6 mm2, for example 0.4-0.5 mm2. In other examples the outlet may be of circular cross-section (e.g. having a diameter of 0.5-1 mm, such as 0.6-0.8 mm, for example 0.75 mm).

The total cross-sectional area of all outlets will suitably be less than 70% of the cross-sectional area of the mixing chamber, such as less than 60% and especially less than 50%.

The mixing chamber should be of adequate length to allow for mixing to be substantially complete by the time liquid reaches the outlet(s). Typically, the chamber will be 1-10 cm in length, such as 1.5-5 cm, especially 1.8-4 cm, in particular 2-3 cm, for example 2.5 cm.

In one embodiment the device comprises a mixing chamber which is rectangular in cross-section, having a cross-sectional area of 0.2-3.2 mm$^2$ (e.g. 0.6-1.0 mm$^2$), a long side of 1.4-3.2 mm (e.g. 1.6-2.4 mm), a short side of 0.1-1.2 mm (e.g. 0.32-0.48 mm), one inlet for the second solution and two inlets for the first solution which are symmetrically disposed at the proximal end of the mixing chamber, a mixing chamber length of 1.5-5 cm (e.g. 2-3 cm) and an outlet located at the distal end of the mixing chamber. Suitably the inlets are 0.16-0.24 mm wide and span the full length of the other side of the mixing chamber.

The microfluidic device may be formed from any suitable material, namely one which is tolerant of the components used in the first solution and second solution and which is amenable to manufacture. Suitable materials include silicon and glass. Devices may be prepared from such materials by etching, e.g. silicon devices may be prepared by Deep Reactive Ion Etching (DRIE or plasma etching) and glass devices may be prepared by wet etching (HF etching).

To achieve a batch run duration which is a manageable time period (e.g. 240 minutes or less, especially 120 minutes or less) it is necessary for the system to achieve a sufficient level of productivity. Additionally, to aid batch to batch consistency by reducing the impact of start up and shutdown effects it is necessary for the run time to be of adequate length (e.g. at least 30 minutes, especially at least 60 minutes).

Methods for Producing Liposomes Encapsulating RNA by Microfluidics

The present invention provides methods for manufacturing a non-viral delivery system comprising a liposome encapsulating an RNA using a microfluidic device. In some embodiments, the methods involve mixing a first lipid solution comprising a solvent with a second aqueous RNA solution, then removing the solvent. The microfluidic device comprises 2-128 mixing chambers.

In some embodiments, a method is provided of using a microfluidic device to manufacture a non-viral delivery system comprising a liposome encapsulating at least one RNA, the microfluidic device comprising one or more inlets for a first solution having a total cross-sectional area of m and one or more inlets for a second solution having a total cross-sectional area of n. The first solution comprises a solvent and ionizable cationic lipid molecules, the second solution comprises a plurality of the RNA, and m/n is a positive number of greater than 1. The method comprises the steps of mixing in the device the first solution, the first solution having a flow rate into the microfluidic device of x and the second solution, the second solution having a flow rate into the microfluidic device of y, wherein x/y is a positive number of less than 1 and removing the solvent.

As described in greater detail elsewhere herein, methods are provided wherein y [volumetric flow rate of aqueous (second) solution]>x [volumetric flow rate of organic (first) solution] and m [cross sectional area of inlet(s) through which the first (organic) solution passes]/n [cross sectional area of inlet(s) through which the second (aqueous) solution passes] is greater than 1, with the resulting linear velocity of the aqueous (second) solution higher than the linear velocity of the organic (first) solution. By comparing these methods to those in which m/n is varied, it was observed that for a given ratio of y>x, higher mixing efficiency is observed where m/n is greater than 1 as compared to methods in which the m/n ratio is less than 1, with observable improvements in one or more of encapsulation efficiency, polydispersity, average particle size, or potency where m/n is greater than 1. The relationship between these parameters can be summarized as:

| | Volumetric flow rate | Cross sectional area | Linear velocity |
|---|---|---|---|
| Relationship | Volumetric flow rate of aqueous, i.e., second solution (y) is greater than | Cross sectional area of inlets for aqueous, i.e., second solution (n) is less than | Linear velocity of aqueous, i.e., second solution is higher than |
| | volumetric flow rate organic, i.e., first solution (x) | cross sectional area of inlets for organic, i.e., first solution (m) | linear velocity of organic, i.e., first solution |
| Relevant ratio | x/y <1 | m/n >1 | n/a |

The number and placement of the inlets for the first solution relative to the inlets for the second solution may be selected to successfully produce liposomes having acceptable physico-chemical characteristics. In some embodiments, there are twice as many inlets for the first solution as inlets for the second solution. In some embodiments, two inlets for the first solution have a neighboring inlet on only one side. In some embodiments the inlets for the first solution are arranged such that one half of the inlets for the first solution are located to one side of the inlets for the second solution and the other half of the inlets for the first solution are located to the other side. In some embodiments, the inlets for the first solution alternate with inlets for the second solution.

Components utilized in the methods herein may be mixed at proportions that successfully produce liposomes having acceptable physico-chemical characteristics. Further, the methods herein may be utilized at specific temperatures and/or flow rates to enhance the physico-chemical characteristics of the liposomes produced.

For instance, the cationic lipid contains nitrogen and the RNA contains phosphate. One μg of RNA contains three nmoles of phosphate. In some embodiments, the nitrogen:phosphate (N:P) ratio is between 1:1 and 16:1; between 2:1 and 12:1; between 3:1 and 8:1; between 4:1 and 8:1; between 5:1 and 8:1. In some embodiments, the N:P ratio is selected from about 1:1; about 2:1; about 3:1; or about 4:1; about 5:1; about 6:1; about 7:1; about 8:1; about 9:1; about 10:1. In some embodiments the N:P ratio is 8:1. In an embodiment where the N:P ratio is 8:1, if the RNA is present at 40 μg/mL (120 nmoles), then the cationic lipid would be present at 960 nmoles.

The ratio of aqueous to organic components used herein may be adjusted to successfully produce LNP having acceptable physico-chemical characteristics. In some embodiments, the ratio of water (i.e., aqueous solution) to organic solvent is between 1:1 and 5:1 v/v; between 1.25:1 and 4:1 v/v; between 1.5 and 3:1 v/v. In some embodiments, the ratio of water to organic solvent is about 1.4:1 v/v; about 2:1 v/v; or about 3:1 v/v. In some embodiments, the ratio of water to organic solvent is about 2:1 v/v. In some embodiments, the organic solvent is ethanol, and the ratio of water to ethanol is between 1:1 and 5:1 v/v; between 1.25:1 and 4:1 v/v; between 1.5 and 3:1 v/v. In preferred embodiments, the ratio of water to ethanol is about 1.4:1; about 2:1; or about 3:1. In even more preferred embodiments, the ratio of water to ethanol is about 2:1.

The temperature of the solution or solutions within the device may also be adjusted to successfully produce LNP having acceptable physico-chemical characteristics. In some embodiments, the temperature of the solution in the microfluidic device is between 10° C. and 37° C., such as between 15° C. and 36° C., between 15° C. and 36° C.; between 15° C. and 19° C.; between 19° C. and 24° C.; between 24° C. and 28° C.; between 28° C. and 36° C., between 20° C. and 35° C., between 25° C. and 34° C., between 30° C. and 33° C., about 17° C., about 22° C., about 26° C., or about 30° C.

By controlling the ratio of the flow rate (y) of the second (aqueous) solution to the flow rate (x) of the first (solvent) solution in the microfluidic device one may successfully produce LNP having overall acceptable physico-chemical characteristics. In some embodiments, y and x are positive numbers having a ratio y:x of between 1:1-19:1, inclusive, such as 10:9, 9:8, 8:7, 7:6, 6:5, 5:4, 4:3, 2:1, 11:5, 9:4, 7:3, 5:2, 3:1, 4:1, 5:1, 10:1, 15:1. In some embodiments, y:x is about 2:1. In some embodiments, the second solution is water comprising a buffer and the solvent of the first solution is ethanol and the ratio of the flow rate of water to ethanol between 1:1-19:1, inclusive, such as 2:1, 3:1, 4:1, 5:1, 10:1, 15:1. In some embodiments, the ratio of the flow rate of water to the flow rate of ethanol is about 2:1.

By controlling the total flow rate (TFR) in the microfluidic device, one may successfully produce liposomes having acceptable physico-chemical characteristics. In some embodiments, the total flow rate of the first solution and second solution combined is between 12.5-93.75 mL/min/ mm$^2$, inclusive, such as 18-82 mL/min/mm$^2$, 25-69 mL/min/ mm$^2$, 27-63 mL/min/mm$^2$. In some embodiments, the total flow rate of the first solution and second solution combined is at least 12 mL/min/mm$^2$, such as at least 18 mL/min/mm$^2$, at least 25 mL/min/mm$^2$, at least 27 mL/min/mm$^2$, or greater. In some embodiments, the total flow rate of the first solution and second solution combined is no more than 94 mL/min/mm$^2$, such as no more than 82 mL/min/mm$^2$, no more than 69 mL/min/mm$^2$, 61 mL/min/mm$^2$, or less. In some embodiments, the total flow rate of the first solution and second solution combined is about 25 mL/min/mm$^2$. In some embodiments, the total flow rate into the mixing chamber is about 27.5 mL/min/mm$^2$.

By controlling cross-sectional area, number and placement of the inlets for the first solution relative to the same aspects for the inlets for the second solution, ratio of flow rate, and total flow rate, one may control the difference between the linear fluid velocity within the inlet of the first solution and the linear fluid velocity within the inlet of the second solution. In some embodiments, the linear fluid velocity within the inlet of the first solution is between 6250-46875 cm/min, such as 7250-35000 cm/min, 8250-25000 cm/min, 8250-15000 cm/min or 9250-12000 cm/min slower than the linear fluid velocity within the inlet of the second solution. In some embodiments, the linear fluid velocity within the inlet of the first solution is at least 6250 cm/min, such as at least 7250 cm/min slower, at least 8250 cm/min slower, at least 9250 cm/min slower, at least 9375 cm/min slower, at least 10250 cm/min slower, at least 13750 cm/min slower, at least 16041 cm/min slower than the linear fluid velocity within the inlet of the second solution. In some embodiments, the linear fluid velocity within the inlet of the first solution is no more than 46875 cm/min, such as 35000 cm/min, 25000 cm/min, 15000 cm/min, 12000 cm/min slower than the linear fluid velocity within the inlet of the second solution.

In some embodiments, the use of the methods above results in at least 80%, such as at least 85%, of the plurality of RNA encapsulated in liposomes. In some embodiments, the use of the methods above results in at least at least 90%, at least 91%, at least 92%, at least 93%, at least 94%, or at least 95% of the plurality of RNA encapsulated in liposomes. In some embodiments, the use of the methods above produces a liposome with an average size of 140 nm or lower, such as 130 nm or lower, 120 nm or lower, 110 nm or lower. In some embodiments, the use of the methods above produces a liposome with an average size of 100 nm or lower, 95 nm or lower, 90 nm or lower, or 85 nm or lower. In some embodiments, the use of the methods above produces a liposome with a polydispersity of 0.5 or lower, such as 0.4 or lower, 0.3 or lower, 0.2, or lower, or 0.1 or lower. In some embodiments, the use of the methods above produces a liposome with a polydispersity of 0.09 or lower, or 0.08 or lower. The potency of the nonviral delivery vehicle may be determined using a SAM-green fluorescent protein (GFP) HBK cell assay. The electroporation-based in vitro potency assay determines the ability of SAM to (self)-replicate and express the encoded vaccine antigen in cultured cells. In vitro potency is an indirect measure of several quality attributes of the SAM RNA and serves as a surrogate for overall RNA functionality. Briefly, BHK cells are electroporated with a limiting amount of SAM RNA and GFP expression is analysed by flow cytometry. The fraction of cells expressing GFP after being transfected with the test article is compared to the fraction of cells expressing the GFP after being transfected with a standard of known potency. EC50 values are calculated. In some embodiments, the nonviral delivery vehicle has an EC50 of less than 0.1 ng/well, such as less than 0.09 ng/well, less than 0.08 ng/well, less than 0.07 ng/well, less than 0.06 ng/well, or less than 0.05 ng/well.

Microfluidic Device Scale-Up

In order to facilitate production of liposome encapsulating an RNA on an industrial scale (e.g. a scale of at least 0.5 g of cationic lipid per minute, such as at least 1 g per minute, in particular at least 2 g per minute and especially at least 4 g per minute), large mixing chambers may be used or plurality of mixing chambers may be operated in parallel. For example, 2 or more mixing chambers, in particular 4 or more, especially 8 or more, such as 16 or more (e.g. 16). The plurality of mixing chambers operated in parallel may be 128 or fewer, such as 64 or fewer, in particular 32 or fewer. Consequently, in some embodiments the plurality of mixing chambers is 2-128, such as 4-64, for example 8-32.

In some circumstances each mixing chamber from the plurality of mixing chambers may be operated independently, with provision of the first solution and second solution to the mixing chamber by independent pumps (i.e. each pump not concurrently providing solution to any other mixing chamber). The first solution and/or second solution may be stored in independent containers (i.e. containers not concurrently providing first solution and/or second solution to more than one mixing chamber), or first solution and/or second solution may be stored in a container for use in more than one mixing chamber (such as all mixing chambers). Mixed material from each mixing chamber may be recovered individually and stored/processed, optionally being combined at a later stage, or may be combined (e.g. from all mixing chambers) before further processing and/or storage.

Conveniently all mixing chambers in the plurality of mixing chambers are supplied by the same pumps and mixed material from all mixing chambers is collected before further processing and/or storage.

Optimally the mixing chambers, inlets and outlets, supply of first solution, second solution and collection of mixed material of multiple mixing chambers are configured such that in operation they perform substantially identically.

Each mixing chamber from the plurality of mixing chambers may be configured as an individual chip or for convenience a number of mixing chambers may be combined in a single chip (e.g. containing 8 mixing chambers). A number of such chips can be used in parallel to provide the plurality of chambers (e.g. two chips each of which contains 8 mixing chambers to provide a total of 16 mixing chambers to be operated in parallel).

Suitably the plurality of mixing chambers is capable of producing mixed material at a total rate of 50-2000 ml/min, such as 100-1000 ml/min, in particular 200-500 ml/min. In some embodiments, the plurality of mixing chambers is capable of producing mixed material at a rate of at least 1 g of cationic lipid per minute. In some embodiments. all mixing chambers in the plurality of mixing chambers are supplied by the same pumps and mixed material from all mixing chambers is collected before further processing and/or storage.

Post Microfluidic Process Steps

In some embodiments, the solvent is removed by buffer exchange, diafiltration, ultrafiltration, dialysis, or a combination thereof. In some embodiments, solvent removal results in a water content of at least 95%; at least 96%; at least 97%; at least 98%; at least 99% at least 99.5% water v/v. In some embodiments, the methods described above are followed by an additional step of diluting, such as to a desired final concentration. In some embodiments, the methods described above are followed by the additional step of sterilization by filtration.

Pharmaceutical Compositions

Liposomes of the invention are useful as components in pharmaceutical compositions for immunising subjects against various diseases. These compositions will typically include a pharmaceutically acceptable carrier in addition to the liposomes. A pharmaceutical composition of the invention may include one or more small molecule immunopotentiators. For example, the composition may include a TLR2 agonist (e.g. Pam3CSK4), a TLR4 agonist (e.g. an aminoalkyl glucosaminide phosphate, such as E6020), a TLR7 agonist (e.g. imiquimod), a TLR8 agonist (e.g. resiquimod (also a TLR7 agonist)) and/or a TLR9 agonist (e.g. IC31). Any such agonist ideally has a molecular weight of <2000 Da. In some embodiments such agonist(s) are also encapsulated with the RNA in liposomes, but in other embodiments they are unencapsulated. Pharmaceutical compositions of the invention may include the liposomes in plain water (e.g. w.f.i.) or in a buffer e.g. a phosphate buffer, a Tris buffer, a borate buffer, a succinate buffer, a histidine buffer, or a citrate buffer. Buffer salts will typically be included in the 5-20 mM range. Pharmaceutical compositions of the invention may have a pH between 5.0 and 9.5 e.g. between 6.0 and 0. Compositions of the invention may include sodium salts (e.g. sodium chloride) to give tonicity. A concentration of 10±2 mg/ml NaCl is typical e.g. about 9 mg/mL.

Compositions of the invention may include metal ion chelators. These can prolong RNA stability by removing ions which can accelerate phosphodiester hydrolysis. Thus a composition may include one or more of EDT A, EGT A, BAPT A, pentetic acid, etc. Such chelators are typically present at between 10-500 mM e.g. 0.1 mM. A citrate salt, such as sodium citrate, can also act as a chelator, while advantageously also providing buffering activity.

Pharmaceutical compositions of the invention may have an osmolality of between 200 mOsm/kg and 750 mOsm/kg, e.g. between 240-360 mOsm/kg, or between 290-310 mOsm/kg. Pharmaceutical compositions of the invention may be hypotonic or mildly hypertonic. Pharmaceutical compositions of the invention may include one or more preservatives, such as thiomersal or 2-phenoxyethanol. Mercury-free compositions are preferred, and preservative-free vaccines can be prepared.

Pharmaceutical compositions of the invention are preferably sterile. Pharmaceutical compositions of the invention are preferably non-pyrogenic e.g. containing <1 ED (endotoxin unit, a standard measure) per dose, and preferably <0.1 EU per dose. Pharmaceutical compositions of the invention are preferably gluten free. Pharmaceutical compositions of the invention may be prepared in unit dose form. In some embodiments a unit dose may have a volume of between 0.1-1.0 ml e.g. about 0.5 ml.

The compositions may be prepared as injectables, either as solutions or suspensions. The composition may be prepared for pulmonary administration e.g. by an inhaler, using a fine spray. The composition may be prepared for nasal, aural or ocular administration e.g. as spray or drops. Injectables for intramuscular administration are typical. Compositions comprise an immunologically effective amount of liposomes, as well as any other components, as needed. By 'immunologically effective amount', it is meant that the administration of that amount to an individual, either in a single dose or as part of a series, is effective for treatment or prevention. This amount varies depending upon the health and physical condition of the individual to be treated, age, the taxonomic group of individual to be treated (e.g. non-human primate, primate, etc.), the capacity of the individual's immune system to synthesise antibodies, the degree of protection desired, the formulation of the vaccine, the treating doctor's assessment of the medical situation, and other relevant factors. It is expected that the amount will fall in a relatively broad range that can be determined through routine trials. The liposome and RNA content of compositions of the invention will generally be expressed in terms of the amount of RNA per dose. A preferred dose has 20≤100 g RNA (e.g. from 10-100 μg, such as about 10 μg, 25 μg, 50 μg, 75 μg or 100 μg), but expression can be seen at much lower levels e.g. ≤1 μg/dose, ≤100 ng/dose, ≤10 ng/dose, ≤1 ng/dose, etc.

The invention also provides a delivery device (e.g. syringe, nebuliser, sprayer, inhaler, dermal patch, etc.) containing a pharmaceutical composition of the invention. This device can be used to administer the composition to a vertebrate subject. Liposomes of the invention do not contain ribosomes.

Methods of Treatment and Medical Uses

Liposomes and pharmaceutical compositions of the invention are for in vivo use for eliciting an immune response against an immunogen of interest, or for immuno- or gene therapy. As disclosed herein, methods for raising an immune response in a vertebrate comprising the step of administering an effective amount of a liposome or pharmaceutical composition of the invention are provided. The immune response is preferably protective and preferably involves antibodies and/or cell mediated immunity. The method may raise a booster response.

The invention also provides a liposome or pharmaceutical composition of the invention for use in a method for raising an immune response in a vertebrate.

The invention also provides a liposome or pharmaceutical composition of the invention for use in a method of immuno- or gene therapy in a vertebrate.

The invention also provides the use of a liposome of the invention in the manufacture of a medicament for raising an immune response, or for immuno- or gene therapy, in a vertebrate.

By raising an immune response in the vertebrate by these uses and methods, the vertebrate can be protected against various diseases and/or infections e.g. against bacterial and/or viral diseases as discussed above. The liposomes and compositions are immunogenic, and are more preferably vaccine compositions. Vaccines according to the invention may either be prophylactic (i.e. to prevent infection) or therapeutic (i.e. to treat infection), but will typically be prophylactic.

The vertebrate is preferably a mammal, such as a human or a large veterinary mammal (e.g. horses, cattle, deer, goats, and pigs). Where the vaccine is for prophylactic use, the human is preferably a child (e.g. a toddler or infant) or a teenager; where the vaccine is for therapeutic use, the human is preferably a teenager or an adult. A vaccine intended for children may also be administered to adults e.g. to assess safety, dosage, immunogenicity, etc.

Vaccines prepared according to the invention may be used to treat both children and adults. Thus a human patient may be less than 1 year old, less than 5 years old, 1-5 years old, 5-15 years old, 15-55 years old, or at least 55 years old. Preferred patients for receiving the vaccines are the elderly (e.g. 20~50 years old, ~60 years old, and preferably ~65 years), the young (e.g. ~5 years old), hospitalized patients, healthcare workers, armed service and military personnel, pregnant women, the chronically ill, or immunodeficient patients. The vaccines are not suitable solely for these groups, however, and may be used more generally in a population.

Compositions of the invention will generally be administered directly to a patient. Direct delivery may be accomplished by parenteral injection (e.g. subcutaneously, intraperitoneally, intravenously, intramuscularly, intradermally, or to the interstitial space of a tissue. Alternative delivery routes include rectal, oral (e.g. tablet, spray), buccal, sublingual, vaginal, topical, transdermal or transcutaneous, intranasal, ocular, aural, pulmonary or other mucosal administration. Intradermal and intramuscular administration are two preferred routes. Injection may be via a needle (e.g. a hypodermic needle), but needle-free injection may alternatively be used. A typical intramuscular dose is 0.5 mL.

The invention may be used to elicit systemic and/or mucosal immunity, preferably to elicit an enhanced systemic and/or mucosal immunity.

Dosage can be by a single dose schedule or a multiple dose schedule. Multiple doses may be used in a primary immunisation schedule and/or in a booster immunisation schedule. In a multiple dose schedule the various doses may be given by the same or different routes e.g. a parenteral prime and mucosal boost, a mucosal prime and parenteral boost, etc. Multiple doses will typically be administered at least 1 week apart (e.g. about 2 weeks, about 3 weeks, about 4 weeks, about 6 weeks, about 8 weeks, about 10 weeks, about 12 weeks, about 16 weeks, etc.). In one embodiment, multiple doses may be administered approximately 6 weeks, 10 weeks and 14 weeks after birth, e.g. at an age of 6 weeks, 10 weeks and 14 weeks, as often used in the World Health Organisation's Expanded Program on Immunisation ("EPI"). In an alternative embodiment, two primary doses are administered about two months apart, e.g. about 7, 8 or 9 weeks apart, followed by one or more booster doses about 6 months to 1 year after the second primary dose, e.g. about 6, 8, 10 or 12 months after the second primary dose. In a further embodiment, three primary doses are administered about two months apart, e.g. about 7, 8 or 9 weeks apart, followed by one or more booster doses about 6 months to 1 year after the third primary dose, e.g. about 6, 8, 10, or 12 months after the third primary dose.

General

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. The term "plurality" refers to two or more. Additionally, numerical limitations given with respect to concentrations or levels of a substance, such as solution component concentrations or ratios thereof, and reaction conditions such as temperatures, pressures and cycle times are intended to be approximate. The term "about" used herein is intended to mean the amount ±10%. Unless specified otherwise, where a numerical range is provided, it is inclusive, i.e., the endpoints are included.

The invention will be further described by reference to the following, non-limiting, figures and examples.

EXAMPLES

Example 1

Conditions for making liposome/RNA delivery vehicles in a two-dimensional vortex chip are described in WO2018220553. Under one set of conditions, an organic phase is pumped through the central channel into the mixing chamber of the chip and an aqueous phase is pumped through the chip's two side channels into the mixing chamber at a total flow rate of 22 mL/min/mm$^2$ with a 2:1 aqueous:organic phase flow ratio. Under these conditions and using ethanol as the organic phase results in a final ethanol concentration of 33%.

The potential to enhance mixing by changing the position of the higher-flow-rate phase and/or creating a larger difference between velocity for the organic and velocity for the aqueous phases was investigated. Flow and mixing of aqueous and organic phases were tested under conditions covering multiple aqueous:organic flow ratios (19:1, 9:1, 5:1, 2:1, 1:1 and 1:2), various total flow rates (16, 22, 26, 56, and 75 mL/min, corresponding to 20, 27.5, 32.5, 70, and 93.75 mL/min/mm² respectively, when normalized to crossectional area of mixing chamber; data for 16, 56, and 75 mL/min not shown), and with either aqueous or organic phase pumped through central capillary of the chip (see the following chart).

| Condition | Total flow rate (mL/min) | Total flow rate* (mL/min/mm²) | A:O phase flow ratio | Phase in central channel | Mixing |
|---|---|---|---|---|---|
| A | 22 | 27.5 | 1:1 | Organic | Standard |
| A' | 22 | 27.5 | 1:1 | Aqueous | Improved |
| B | 22 | 27.5 | 2:1 | Organic | Standard |
| B' | 22 | 27.5 | 2:1 | Aqueous | Improved |
| C | 26 | 32.5 | 2:1 | Organic | Standard |
| C' | 26 | 32.5 | 2:1 | Aqueous | Improved |
| D | 22 | 27.5 | 5:1 | Organic | Standard |
| D' | 22 | 27.5 | 5:1 | Aqueous | Improved |
| E | 22 | 27.5 | 1:2 | Organic | Improved |

Further data is provided in the following chart.

| | | | | | |
|---|---|---|---|---|---|
| F | 22 | 27.5 | 9:1 | Aqueous | Improved |
| G | 22 | 27.5 | 19:1 | Aqueous | Improved |
| H | 38 | 47.5 | 2:1 | Organic | Standard |
| H' | 38 | 47.5 | 2:1 | Aqueous | Improved |
| I | 56 | 70 | 2:1 | Organic | Standard |
| I' | 56 | 70 | 2:1 | Aqueous | Improved |

* Total flow rate normalized to crossectional area of mixing chamber.

In the format of the chip described above, one solution passes through the central channel to enter a mixing chamber and the other solution passes through two side channels to enter a mixing chamber. Thus, where each channel has the same cross-sectional area, when equal volumes of each solution pass through the mixing chamber (such as in condition A and A'), the solution in the central channel has a faster velocity than the solution in either of the side channels. Where the volume of the aqueous solution passing through the side channels is double the volume of the organic solution passing through the central channel (2:1 A:O flow ratio), as in condition B, the solution in the central channel has a linear velocity roughly the same as that of the solution in each of the side channels. However, if one maintains the 2:1 A:O flow ratio but switches the path such that the aqueous solution passes through the central channel while the organic solution passes through the side channels (as in condition B'), the linear velocity of the aqueous solution through the central channel is much greater than that of the organic solution in each side channel. In each instance where the path was switched while maintaining the flow ratio (such that the velocity of the solution in the central channel increased), mixing efficiency was observed to improve significantly (See FIG. 1 with examples). Feasibility of liposome production in improved conditions was demonstrated in A:O range of 1:1-4:1, as depicted in the following table. The A:O ratio of 2:1 was observed as optimal, thus conditions B and B' were selected for further investigation.

| Condition | Total flow rate (mL/min/mm²) | A:O phase flow ratio | Mixing | RNA encapsulation (%) | Hydrodynamic diameter (nm) | PDI |
|---|---|---|---|---|---|---|
| A' | 27.5 | 1:1 | Improved | 13.50 | 204.53 | 0.12 |
| B' | 27.5 | 2:1 | Improved | 94.81 | 103.00 | 0.09 |
| J' | 27.5 | 4:1 | Improved | 7.94 | 165.60 | 0.22 |

Triplicate batches of LNPs were made using condition B and compared to triplicate batches of LNPs made using B', as set forth in the following chart.

| Batch Number | Condition | RNA encapsulation (%) | Hydrodynamic diameter (nm) | SD for Dh | PDI |
|---|---|---|---|---|---|
| 1 | B | 79.94 | 112.07 | 2.01 | 0.13 |
| 1 | B' | 88.11 | 86.21 | 1.31 | 0.08 |
| 2 | B | 81.95 | 108.40 | 2.43 | 0.10 |
| 2 | B' | 91.36 | 86.50 | 1.59 | 0.08 |
| 3 | B | 61.63 | 127.97 | 2.61 | 0.13 |
| 3 | B' | 79.59 | 88.69 | 1.28 | 0.08 |

Average liposome characteristics were calculated across the three batches. Improvement in all characteristics were observed under condition B'. (See FIG. 2A-FIG. 2C.) Liposomes formulated using condition B' had higher potency compared to liposomes formulated using condition B. (See FIG. 3) A more uniform particle size distribution was observed for condition B' compared to condition B (see FIG. 4).

Improved or maintained characteristics of LNP were observed independent of the RNA construct used, as depicted in the following chart.

| RNA construct | Condition | RNA encapsulation (%) | Hydrodynamic diameter (nm) | PDI |
|---|---|---|---|---|
| Rabies | B | 81 | 127 | 0.13 |
| Rabies | B' | 89 | 123 | 0.09 |
| gB | B | 82 | 131 | 0.12 |
| gB | B' | 92 | 111 | 0.09 |

To investigate the impact of increased total flow rates of aqueous and organic phases on the mixing efficiency and liposome characteristics, several batches of liposomes were made using conditions B, H, I, (standard mixing) and were compared to liposomes made using conditions B', H' and I' (improved mixing). The liposomes made in improved mixing conditions (B', H' and I') had smaller size and lower polydispersity, as shown in table below.

| TFR (mL/min/mm²) | Condition | RNA concentration (ug/ml) | RNA encapsulation (%) | Hydrodynamic diameter (nm) | PDI |
|---|---|---|---|---|---|
| 27.5 | B | 44.89 | 76.93 | 110.5 | 0.13 |
| 47.5 | H | 56.53 | 79.60 | 116.6 | 0.14 |
| 68.75 | I* | 63.87 | 80.24 | 107.5 | 0.12 |
| 27.5 | B' | 58.62 | 77.73 | 93.8 | 0.09 |

-continued

| TFR (mL/min/mm$^2$) | Condition | RNA concentration (ug/ml) | RNA encapsulation (%) | Hydrodynamic diameter (nm) | PDI |
|---|---|---|---|---|---|
| 47.5 | H' | 66.42 | 81.25 | 90.1 | 0.09 |
| 68.75 | I* | 56.00 | 78.95 | 92.9 | 0.08 |

Caption: I*/I'* The TFR for these conditions is 68.7 mL/min/mm instead of 70 mL/min as for I/I'Smaller size and decreased polydispersity of liposomes are desirable in context of filtration, where large particles are known to cause lower process performance due to fouling of filtration membrane. Thus decrease in liposome size and polydispersity leads to process improvement.

To demonstrate the applicability of the improved mixing method for production of liposomes in a wide range of RNA and lipid concentrations, the liposomes were prepared at 125 μg/mL and 400 μg/mL RNA concentration (and proportionally scaled concentration of lipids), under various combined total flow rates of aqueous and organic phases (6.25-70 mL/min/mm$^2$) and A:O ratio of 2:1 (see FIG. 5). Well defined liposomes with acceptable characteristics were produced in both concentrations at TFR=27.5 mL/min/mm$^2$ or higher (see FIG. 5). Although TFR of 18.75 mL/min/mm$^2$ also yielded well defined liposomes, they were of less desirable characteristics.

In addition, the improved mixing was observed in chips with alternative designs (dimensions). Batches of liposomes were formulated using alternative chip designs and the improved mixing conditions with good characteristics (see following chart).

| Chip ID | Depth (μm) | Width External channels (mm) | Width Internal channel (mm) | TFR (mL/min/mm$^2$) | RNA entrapment (%) | Hydrodynamic diameter (nm) | PDI |
|---|---|---|---|---|---|---|---|
| 1 (Standard) | 400 | 0.2 | 0.2 | 68.75 | 87.6 | 107 | 0.10 |
| 2 | 400 | 0.2 | 0.4 | 68.75 | 81.8 | 126.2 | 0.12 |
| 3 | 400 | 0.4 | 0.2 | 68.75 | 89.5 | 100.3 | 0.08 |
| 4 | 500 | 0.2 | 0.4 | 68.75 | 80 | 125.4 | 0.12 |

The invention claimed is:

1. A method of making a lipid nanoparticle (LNP) in a microfluidic device;
  the LNP comprising a liposome and a ribonucleic acid (RNA); the liposome encapsulating at least one molecule of the RNA, thereby forming the LNP; the liposome comprising lipids; the lipids comprising an ionizable cationic lipid;
  the microfluidic device comprising a mixing chamber, at least two of a first inlet channel into the mixing chamber, and at least one of a second inlet channel into the mixing chamber; the microfluidic device comprising twice as many of the first inlet channels into the mixing chamber as the second inlet channel into the mixing chamber; the second inlet channel into the mixing chamber being located between the at least two of the first inlet channels into the mixing chamber; each first inlet channel into the mixing chamber having a first cross-sectional area; the at least two of the first inlet channel into the mixing chamber having a total of the first cross-sectional areas, which is m; each second inlet channel into the mixing chamber having a second cross-sectional area; the at least one of the second inlet having a total of the second cross-sectional area, which is n; m/n being a positive number of greater than 1;
  the method comprising:
  (a) mixing in the mixing chamber a first solution and a second solution, thereby obtaining a mixed material;
    the first solution: (i) being delivered into the mixing chamber through the at least two of the first inlet channels into the mixing chamber, (ii) comprising an organic solvent and the lipids, and (iii) having a flow rate of volume per unit time into the microfluidic device, which is x; and
    the second solution: (i) being delivered into the mixing chamber through the at least one of the second inlet channel into the mixing chamber, (ii) being an aqueous solution, (iii) comprising the RNA, and (iv) having a flow rate of volume per unit time into the microfluidic device, which is y; y and x being positive numbers and having a ratio of y:x of from 1.5:1 to 3:1 and having a total flow rate of the first solution and second solution combined into the mixing chamber of at least 25 mL per min per mm$^2$ of cross-sectional area of the mixing chamber perpendicular to the flow through the mixing chamber; the mixed material comprising the LNP and the solvent; and
  (b) removing the solvent from the mixed material.

2. The method of claim 1, wherein the ratio y:x is about 2:1.

3. The method of claim 2, wherein the total flow rate of the first solution and second solution combined into the mixing chamber is from 27 mL per min per mm$^2$ of cross-sectional area of the mixing chamber perpendicular to the flow through the mixing chamber to 63 mL per min per mm$^2$ of cross-sectional area of the mixing chamber perpendicular to the flow through the mixing chamber.

4. The method of claim 1, wherein the total flow rate of the first solution and second solution combined is no more than 69 mL per min per mm$^2$ of cross-sectional area of the mixing chamber perpendicular to the flow through the mixing chamber.

5. The method of claim 1, wherein the linear fluid velocity within the at least two of the first inlet channel into the mixing chamber is from 6250 cm/min to 46875 cm/min.

6. The method of claim 1, wherein the total flow rate of the first solution and second solution combined into the mixing chamber is 25 mL/min/mm$^2$.

7. The method of claim 1, wherein the organic solvent comprises from 70% (v/v) to 100% (v/v) ethanol.

8. The method of claim 1, wherein the first solution comprises at least 1 mg/ml of the lipids.

9. The method of claim 1, wherein the microfluidic device comprises a plurality of the mixing chambers.

10. The method of claim 9 further comprising a first pump and a second pump; the first pump supplying the first solution to each mixing chamber in the plurality of the mixing chambers; and the second pump supplying the second solution to each mixing chamber in the plurality of the mixing chambers, wherein the mixed material from all the mixing chambers is collected before (b).

11. The method of claim 1, wherein at least 90% by mass of the RNA is encapsulated in the liposomes.

12. The method of claim 1, wherein the average liposome size is 140 nm or lower.

13. The method of claim 1, wherein the liposome polydispersity is 0.5 or lower.

14. The method of claim 1, wherein the lipids further comprise a zwitterionic lipid, a sterol, and a conjugated lipid.

15. The method of claim 14, wherein: the zwitterionic lipid comprises 1,2-distearoyl-sn-glycero-3-phosphocholine (DSPC); the conjugated lipid comprises a poly(ethylene glycol)-conjugated (PEGylated) lipid; the PEGylated lipid comprises 1,2-dimyristoyl-sn-glycero-3-phosphoethanolamine-N-[methoxy (polyethylene glycol)] or 1,2-dimyristoyl-sn-glycerol, methoxypoly(ethylene glycol).

16. The method of claim 1, the method further comprising after (a) sterilizing by filtering.

17. The method of claim 1, wherein the liposome encapsulating the at least one RNA has an EC50 of less than 0.1 ng/well.

* * * * *